(12) United States Patent
Taniguchi

(10) Patent No.: US 8,144,809 B2
(45) Date of Patent: Mar. 27, 2012

(54) MODULATING APPARATUS, MOBILE COMMUNICATION SYSTEM, MODULATING METHOD, AND COMMUNICATION METHOD

(75) Inventor: Masaru Taniguchi, Yokohama (JP)

(73) Assignee: Kabushiki Kaisha Kenwood, Hachiouji-shi, Tokyo (JP)

(*) Notice: Subject to any disclaimer, the term of this patent is extended or adjusted under 35 U.S.C. 154(b) by 0 days.

(21) Appl. No.: 12/617,019

(22) Filed: Nov. 12, 2009

(65) Prior Publication Data

US 2010/0056081 A1 Mar. 4, 2010

Related U.S. Application Data

(62) Division of application No. 10/578,228, filed as application No. PCT/JP2004/016620 on Nov. 2, 2004, now Pat. No. 7,702,033.

(30) Foreign Application Priority Data

Nov. 6, 2003 (JP) ................................ 2003-377624

(51) Int. Cl.
*H04L 27/12* (2006.01)
(52) U.S. Cl. ........ 375/303; 375/295; 375/299; 375/302; 375/311; 375/316
(58) Field of Classification Search .................. 375/133, 375/135–136, 219, 259, 260, 271, 281, 295, 375/302, 316, 322, 342, 349, 350, 130, 132, 375/303, 16
See application file for complete search history.

(56) References Cited

U.S. PATENT DOCUMENTS

| 5,761,243 A | 6/1998 | Russell et al. |
| 6,674,812 B1 * | 1/2004 | Stevenson ..................... 375/302 |

(Continued)

FOREIGN PATENT DOCUMENTS

BE 1007528 7/1995

(Continued)

OTHER PUBLICATIONS

International Search Report for PCT/JP2004/016620.

(Continued)

*Primary Examiner* — Hirdepal Singh
(74) *Attorney, Agent, or Firm* — Eric J. Robinson; Robinson Intellectual Property Law Office, P.C.

(57) ABSTRACT

An encoder encodes audio data and the like to generate a binary signal. A mapper converts the binary signal into a four-level symbol and outputs the four-level symbol. A base band filter includes a root raised cosine filter and a sinc filter. The base band filter blocks a predetermined frequency component of a symbol to shape the symbol into a waveform signal and outputs the waveform signal shape. An FM modulator transmits a signal subjected to FM modulation according to a magnitude of an amplitude of a waveform signal to a receiving unit. When a symbol of ±3 is outputted from the mapper, a frequency shift of a signal transmitted from the FM modulator has a predetermined value in a range of ±0.822 [kHz] to ±0.952 [kHz]. This makes it possible to provide a modulating apparatus, a mobile communication system, a modulating method, and a communication method that use a modulating method that can conform to the FCC rule to be enforced in 2005 without using a linear power amplifier.

6 Claims, 19 Drawing Sheets

U.S. PATENT DOCUMENTS

| | | | |
|---|---|---|---|
| 7,079,616 B2 * | 7/2006 | Castiglione et al. | 375/376 |
| 7,212,583 B2 | 5/2007 | Lindh | |
| 7,221,711 B2 | 5/2007 | Woodworth | |
| 7,230,994 B2 | 6/2007 | Noda | |
| 7,251,289 B2 | 7/2007 | Kaku et al. | |
| 7,256,839 B2 * | 8/2007 | Choi et al. | 348/614 |
| 2003/0194017 A1 * | 10/2003 | Woodworth | 375/286 |
| 2004/0218699 A1 * | 11/2004 | Carsello | 375/343 |
| 2005/0105594 A1 * | 5/2005 | Giannakis et al. | 375/132 |
| 2007/0009061 A1 * | 1/2007 | Kaku et al. | 375/295 |

FOREIGN PATENT DOCUMENTS

| | | |
|---|---|---|
| DE | 694 30 284 | 3/1995 |
| EP | 0 644 677 | 3/1995 |
| EP | 1 271 873 | 1/2003 |
| JP | 06-252971 | 9/1994 |
| JP | 07-177183 | 7/1995 |
| JP | 08-237313 | 9/1996 |
| JP | 2002-111754 | 4/2002 |
| JP | 2003-087341 | 3/2003 |

OTHER PUBLICATIONS

International Preliminary Examination Report dated Aug. 3, 2006, for PCT/JP2004/016620.

Extended European Search Report (Application No. 09009107.5) dated Sep. 30, 2011 (7 pages).

Supplementary European Search Report (Application No. 04799558.4) dated Sep. 30, 2011 (3 pages).

* cited by examiner

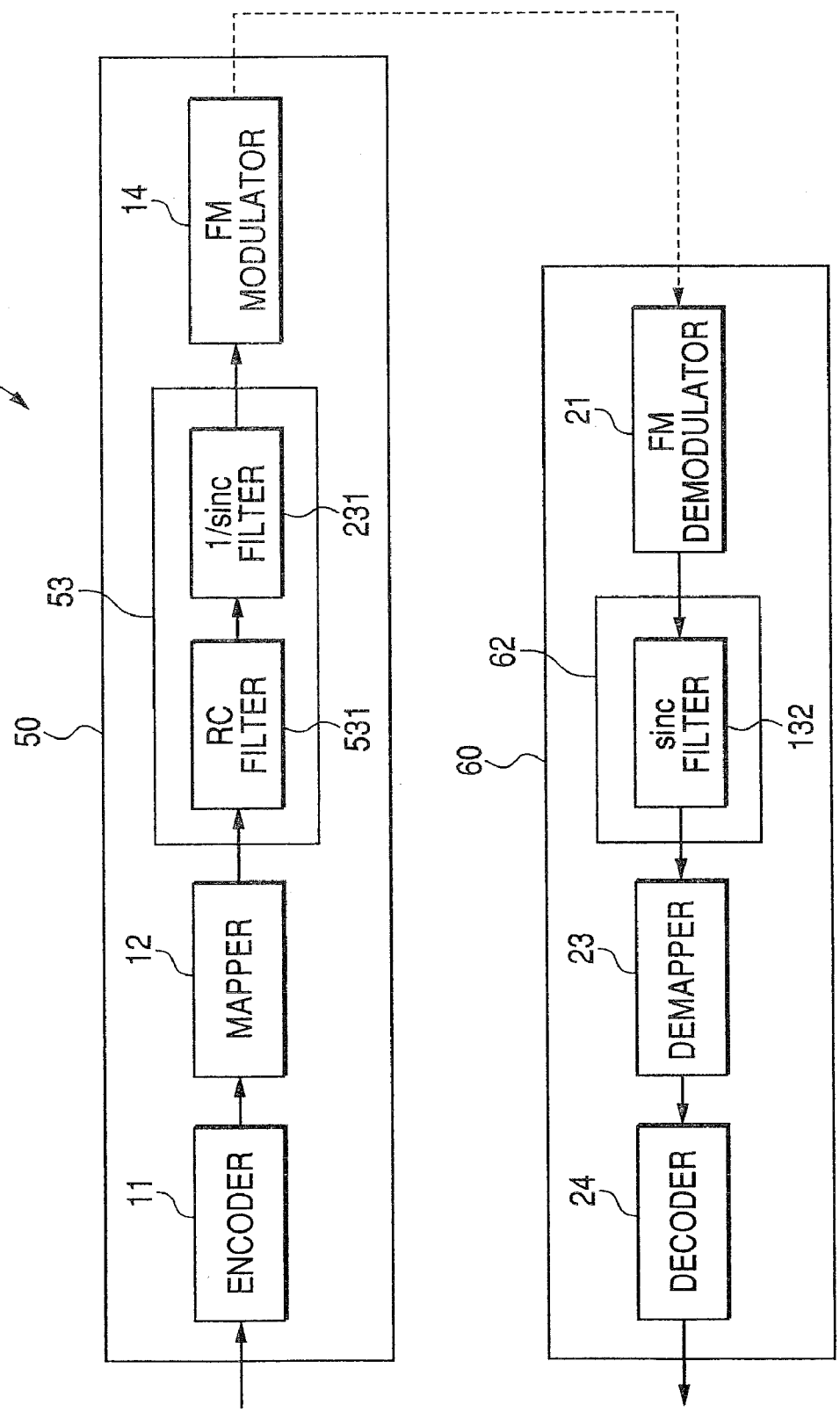

MODULATING APPARATUS, MOBILE COMMUNICATION SYSTEM, MODULATING METHOD, AND COMMUNICATION METHOD

TECHNICAL FIELD

The present invention relates to a modulating apparatus, a mobile communication system, a modulating method, and a communication method, and more particularly, to a modulating apparatus, a mobile communication system, a modulating method, and a communication method that can conform to the FCC rule to be enforced in 2005 without using a linear power amplifier.

BACKGROUND ART

Conventionally, the Land Mobile Radio (LMR) system in the United States has extremely low spectrum efficiency because frequencies are allocated to respective channels at extremely wide channel spacing such as 25 kHz or 30 kHz. To improve this spectrum efficiency, the Federal Communications Commission (FCC) of the United States provided in the FCC rule that, from 1997, the channel spacing be changed, to 12.5 kHz that was half the conventional spectrum efficiency. Consequently, the LMR system was operated at the channel spacing of 25 kHz or 12.5 kHz. This change of the channel spacing is explained in the FCC Rule (Title 47 Code of Federal Regulations PART 90: Private Land Mobile Radio Services)).

To further improve the spectrum efficiency, in 2005, the FCC rule for changing the channel spacing to 6.25 kHz, which is half the present spectrum efficiency, will be enforced. Therefore, in accordance with the enforcement of the FCC rule in 2005, it is necessary to develop an LMR system that can be operated even at the channel spacing of 6.25 kHz.

The FCC rule to be enforced in 2005 provides, as conditions for the LMR system, that the LMR system have spectrum efficiency capable of operating one sound channel per 6.25 kHz band and have a transfer rate equal to or higher than 4800 bps per 6.25 kHz band. It is possible to allow the LMR system to operate one sound channel per 6.25 kHz band by adopting the FDMA (Frequency Division Multiple Access) system in the 6.25 kHz band or the 4-slot TDMA (Time Division Multiple Access) system in the 25 kHz band. In recent years, since it is a general practice to transmit character data and the like in addition to sound data, it is desirable that the LRM system to be developed for the enforcement of the FCC rule in 2005 is capable of communicating not only sound data but also character data and the like.

First, the FCC rule that sets the standard of the present LMR system applicable to the channel spacing of 12.5 kHz will be explained. The FCC rule (Title 47 Part 90.210: Emission masks) prescribes emission masks corresponding to respective bands. A mask D having characteristics shown in Table 1 below and FIG. 1 is stipulated for the 12.5 kHz band.

TABLE 1

| Displacement Frequency Range | Attenuation (dB) |
| --- | --- |
| fd < 5.625 kHz | 0 |
| 5.625 kHz < fd < 12.5 kHz | 7.27 (fd − 2.88) |
| fd > 12.5 kHz | 70 or 50 + 10 log10 (P) whichever the lesser ATT |

In the table, fd is a displacement frequency range from a center frequency and is represented by a unit kHz. P is a transmission power and is represented by a unit W.

Most of the present LMR systems applicable to the channel spacing of 12.5 kHz transmit an analog sound signal after subjecting the analog sound signal to Frequency Modulation (FM modulation) (analog FM modulation). A sound band and a maximum frequency shift of the LMR systems are as shown in Table 2 below.

TABLE 2

| Modulation System | FM Modulation |
| --- | --- |
| Sound Band | 0.3 kHz to 3 kHz |
| Maximum Frequency Shift | ±2.5 kHz Shift |

The modulation system (APCO P25 Phase 1 modulation system, hereinafter "P25-P1 modulation system"), which was examined as the Project 25 in the APCO (Association of Public Safety Communications Officials) and, then, enacted as the standard (TIA102) by the TIA (Telecommunications Industry Association) is also used as a modulation system of the LMR system applicable to the channel spacing of 12.5 kHz. This modulation system is a system for transmitting a digital signal of a base band according to four-level FSK modulation. A transmission rate, a symbol rate, a base band filter, and a nominal frequency shift of the modulation system are as shown in Table 3 below.

TABLE 3

| | |
| --- | --- |
| Transfer Rate | 9600 bps |
| Symbol Rate | 4800 symbol/s |
| Base Band Filter | Transmission: A filter obtained by combining a filter having a Raised Cosine characteristic with α = 0.2 and a shaping filter Reception: An integrate and dump filter |
| Modulation System | Four-Level FSK Modulation |
| Nominal Frequency Shift | Shifts of +3 = +1.8 kHz, +1 = +0.6 kHz, −1 = −0.6 kHz, and −3 = −1.8 kHz for respective four symbol levels (±3, ±1) |

In measuring an emission spectrum at the time when the analog FM modulation system is used, the FCC rule provides, as a measurement condition, that a modulation frequency be set to 2.5 kHz and that the emission spectrum be measured by being modulated at a level increased by 16 dB from a modulation signal level at which 50% of a maximum frequency shift is obtained. A waveform of the emission spectrum set to satisfy this condition and the emission mask (mask D) are shown in FIG. 2. As shown in FIG. 2, it is provided that the emission mask be substantially at the same level as a line of a high-order component of 2.5 kHz.

A waveform of an emission spectrum measured using pseudo-random data as a modulation signal in the P25-P1 modulation system and the emission mask (mask D) are shown in FIG. 3. Since the pseudo-random data is used as the modulation signal, as shown in FIG. 3, the emission spectrum measured has a uniformly distributed spectrum shape and conforms to the mask D.

A waveform of an emission spectrum measured using data with symbols +3 and −3, that is, data with shifts +1.8 kHz and −1.8 kHz rather than the pseudo-random data and the emission mask (mask D) are shown in FIG. 4. Since a symbol rate is 4800 symbol/s and a rectangular wave is shaped to a sine wave by a base band filter, the emission spectrum measured is equivalent to a spectrum subjected to FM modulation with a frequency shift of a certain value by a sine wave of 2.4 kHz.

As shown in FIG. 4, the emission spectrum measured has a peak at a frequency integer times as high as 2.4 kHz and third-order and fourth-order components of the emission spectrum slightly deviate from the mask D.

The FCC rule stipulates a mask E having a characteristic shown in Table 4 below and FIG. 5 for the 6.25 kHz band.

TABLE 4

| Displacement Frequency Range | Attenuation (dB) |
| --- | --- |
| fd < 3.0 kHz | 0 |
| 3.0 kHz < fd < 4.6 kHz | 65 or 30 + 16.67 (fd − 3) or 55 + 10 log10 (P) whichever the lesser ATT |
| fd > 4.6 kHz | 65 or 55 + 10 log10 (P) whichever the lesser ATT |

In order to adapt an emission spectrum to the mask E, the analog modulation FM modulation system is applied as the modulation system in one case and the P25-P1 modulation system is applied as the modulation system in another case. These cases will be examined.

In the past, when the channel spacing was revised from 25 kHz to 12.5 kHz, an emission spectrum could be adapted to the emission mask (mask D) stipulated by the FCC rule by changing a frequency shift in the analog modulation FM modulation system from the 5 kHz shift to the 2.5 kHz shift. A waveform of an emission spectrum measured by changing a frequency shift from the 2.5 kHz shift to the 1.25 kHz shift following this example (at a modulation frequency of 2.5 kHz) and the emission mask (mask E) are shown in FIG. 6. As shown in FIG. 6, obviously, the emission spectrum measured does not conform to the emission mask.

A waveform in the case in which a transmission rate and a frequency shift were set to half as large as those at a channel spacing of 12.5 kHz and pseudo-random data was used as a modulation signal in the P25-P1 modulation system and the emission mask (mask E) are shown in FIG. 7. A waveform of an emission spectrum in the case in which data with a symbol alternately taking ±3 was used as a modulation signal in the P25-P1 modulation system and the emission mask (mask E) are shown in FIG. 8.

Since the emission spectrum shown in FIG. 7 is uniformly distributed, the emission spectrum seemingly conforms to the emission mask. However, actually, as shown in FIG. 8, the emission spectrum does not conform to the emission mask.

Simply by halving the parameters such as a transmission rate and a frequency shift of the modulation system currently applied to the LMR system applicable to the channel spacing of 12.5 kHz in this way, it is impossible to adapt the emission spectrum to the emission mask (mask E).

A case in which another modulation system is used for the LMR system to adapt an emission spectrum to an emission mask (mask E) will be explained. For example, a case in which a modulation system of the APCO P25 Phase 2 standard (hereinafter, "P25-P2 modulation system") is applied to the LMR system will be examined. This P25-P2 modulation system is a system in which a modulation system on a transmission side is changed to the π/4QPSK modulation system while keeping a data format of the P25-P1 modulation system as it is. A transmission rate, a symbol rate, a base band filter, and a phase shift of this modulation system are as shown in Table 5 below.

TABLE 5

| | |
| --- | --- |
| Transmission Rate | 9600 bps |
| Symbol Rate | 4800 symbol/s |
| Base Band Filter | Transmission: A filter having a Raised Cosine characteristic with α = 0.2 Reception: An integrate and dump filter |
| Modulation System | π/4 QPSK modulation |
| Phase Shift | Shifts of +3 = +3/4p, +1 = +1/4p, −1 = −1/4p, and −3 = −3/4p for respective four symbol levels (±3, ±1) |

A waveform of an emission spectrum measured when pseudo-random data was modulated by the P25-P2 modulation system and the emission mask (mask E) are shown in FIG. 9. Since the P25-P2 modulation system is based on the π/4QPSK modulation system, as shown in FIG. 9, the emission spectrum measured has a characteristic of steeply attenuating out of a band and conforms to the emission mask (mask E) despite the fact that the transmission rate is 9600 bps.

However, since the π/4QPSK modulation system is a linear modulation system, problems described below Occur.

It is impossible to use a nonlinear power amplifier used in the present LMR system. In order to use a linear power amplifier in the LMR system, since an additional circuit such as a linearizer is required, a space and cost for the LMR system increase. Since the linear power amplifier has lower efficiency and a larger consumed current compared with the nonlinear power amplifier, heat generation in a radio apparatus constituting the LMR system causes a problem. Moreover, in a portable LMR system, since the portable LMR system is driven by a battery, an operation time decreases.

At this moment, a linear power amplifier having an output power that is the same as that of the conventional nonlinear power amplifier and having efficiency equivalent to that of the conventional nonlinear power amplifier has not been developed. In addition, it is extremely difficult to make a mounting space and cost of a linear power amplifier equivalent to those of the non-linear power amplifier. Therefore, it is not realistic to apply the linear modulation system represented by the P25-P2 modulation system to the LMR system applicable to the channel spacing of 6.25 kHz.

The invention has been devised to solve the problems and it is an object of the invention to provide a modulating apparatus, a mobile communication system, a modulating method, and a communication method that can conform to the FCC rule to be enforced in 2005 without using a linear power amplifier.

DISCLOSURE OF THE INVENTION

In order to attain the object of the invention, the invention provides a modulating apparatus in a mobile communication system that performs data communication at a rate for transmitting 2400 multi-value symbols per second. This modulating apparatus includes: a base band filter that blocks an unnecessary frequency component of a multi-value symbol inputted and outputs a waveform signal; and frequency shifting and modulating means for shifting to modulate a frequency of an output signal according to a magnitude of an amplitude of the waveform signal inputted from the base band filter. The frequency shifting and modulating means is adjusted such that, when a symbol having a maximum absolute value is inputted, an output signal has an absolute value of a frequency shift in a range of 0.822 [kHz] to 0.952 [kHz].

In order to attain the object, a modulating apparatus according to a first aspect of the invention is a modulating apparatus in a mobile communication system that performs data communication at a transmission rate of 2400×(n+1) (n: natural number) [bps]. The modulating apparatus includes: symbol converting means for sequentially converting a binary signal generated by encoding predetermined data into a $2^{(n+1)}$-ary symbol, which includes ($2^{(n+1)}$+1−2 k) ($1 \leq k \leq 2^{(n+1)}$) values, (n+1) bits at a time and outputting the symbol; a base band filter that blocks an unnecessary frequency component of a symbol inputted from the symbol converting means and outputs a waveform signal; and frequency shifting and modulating (FM) means for shifting to modulate a frequency of an output signal according to a magnitude of an amplitude of the waveform signal inputted from the base band filter. When a symbol of $\pm(2^{(n+1)}-1)$ is outputted from the symbol converting means, a frequency shift of the output signal from the frequency shifting and modulating means is set to take a value in a range of ±0.822 [kHz] to ±0.952 [kHz].

In the modulating apparatus, the base band filter may be a Nyquist filter.

In order to attain the object, a mobile communication system according to a second aspect of the invention is a mobile communication system including: a transmitter that performs transmission of data at a transmission rate of 2400×(n+1) (n: natural number) [bps]; and a receiver that receives data transmitted from the transmitter. The transmitter includes: encoding means for encoding predetermined data to generate a binary signal; symbol converting means for sequentially converting a binary signal generated by the encoding means into a $2^{(n+1)}$-ary symbol, which includes ($2^{(n+1)}$+1−2 k) ($1 \leq k \leq 2^{(n+1)}$) values, (n+1) bits at a time and outputting the symbol; a first base band filter that blocks an unnecessary frequency component of a symbol inputted from the symbol converting means and outputs a waveform signal; and frequency shifting and modulating (FM) means for transmitting a signal, which is obtained by shifting to modulate a frequency according to a magnitude of an amplitude of the waveform signal inputted from the first base band filter, to the receiver. The receiver includes: demodulating means for demodulating the signal transmitted from the transmitter and received and outputting a $2^{(n+1)}$-ary signal; a second base band filter that blocks an unnecessary frequency component of the $2^{(n+1)}$-ary signal outputted from the demodulating means and outputs the $2^{(n+1)}$-ary signal; binary signal converting means for sequentially converting a $2^{(n+1)}$-ary signal inputted from the second base band filter into a binary signal of (n+1) bits and outputting the binary signal; and decoding means for decoding a binary signal inputted from the binary signal converting means and outputting the predetermined data. When a symbol of $\pm(2^{(n+1)}-1)$ is outputted from the symbol converting means, a frequency shift of a signal outputted from the frequency shifting and modulating means is set to take a value in a range of ±0.822 [kHz] to ±0.952 [kHz].

In the mobile communication system, the first and second base band filters may be Nyquist filters.

In the mobile communication system, the first base band filter may include a root raised cosine filter and a sinc filter. The second base band filter includes a root raised cosine filter and a 1/sinc filter that has a characteristic opposite to that of the sinc filter. A nominal frequency shift of the symbol of $\pm(2^{(n+1)}-1)$ may be set to a value $\pi/2\sqrt{2}$ times as large as a frequency shift of a signal outputted from the frequency shifting and modulating means.

Moreover, in the mobile communication system, the first and second base band filters may include root raised cosine filters. The nominal frequency shift of the symbol of $\pm(2^{(n+1)}-1)$ may be set to a value $1/\sqrt{2}$ times as large as a frequency shift of a signal outputted from the frequency shifting and modulating means.

In the mobile communication system, the first base band filter may include a raised cosine filter and a 1/sinc filter. The second base band filter may include a sinc filter that has a characteristic opposite to that of the 1/sinc filter. The nominal frequency shift of the symbol of $\pm(2^{(n+1)}-1)$ may be set to a value $2/\pi$ times as large as a frequency shift of a signal outputted from the frequency shifting and modulating means.

In order to attain the object, a modulating method according to a third aspect of the invention is a modulating apparatus in a mobile communication system that performs data communication at a transmission rate of 2400×(n+1) (n: natural number) [bps]. The modulating method includes: a symbol converting step of sequentially converting a binary signal generated by encoding predetermined data into a $2^{(n+1)}$-ary symbol, which includes ($2^{(n+1)}$+1−2 k) ($1 \leq k \leq 2^{(n+1)}$) values, (n+1) bits at a time and outputting the symbol; a step of blocking an unnecessary frequency component of a symbol inputted at the symbol converting step and outputting a waveform signal; and a frequency shifting and modulating (FM) step of shifting to modulate a frequency of an output signal according to a magnitude of an amplitude of the waveform signal inputted. When a symbol of $\pm(2^{(n+1)}-1)$ is outputted from the symbol converting step, a frequency shift of the output signal from the frequency shifting and modulating step is set to take a value in a range of ±0.822 [kHz] to ±0.952 [kHz].

In order to attain the object, a communication method according to a fourth aspect of the invention is a communication method in a mobile communication system including: a transmitter that performs transmission of data at a transmission rate of 2400×(n+1) (n: natural number) [bps]; and a receiver that receives data transmitted from the transmitter. The communication method includes: an encoding step of encoding predetermined data to generate a binary signal; a symbol converting step of sequentially converting a binary signal generated by the encoding step into a $2^{(n+1)}$-ary symbol, which includes ($2^{(n+1)}$+1−2 k) ($1 \leq k \leq 2^{(n+1)}$) values, (n+1) bits at a time and outputting the symbol; a step of blocking an unnecessary frequency component of a symbol inputted from the symbol converting step and outputting a waveform signal; a frequency shifting and modulating (FM) step of transmitting a signal, which is obtained by shifting to modulate a frequency according to a magnitude of an amplitude of the waveform signal inputted from the first base band filter, to the receiver; a demodulating step of demodulating the signal transmitted from the transmitter and received and outputting a $2^{(n+1)}$-ary signal; a step of blocking an unnecessary frequency component of the $2^{(n+1)}$-ary signal outputted from the demodulating step and outputting the $2^{(n+1)}$-ary signal; a binary signal converting step of sequentially converting a $2^{(n+1)}$-ary signal inputted into a binary signal of (n+1) bits and outputting the binary signal; and a decoding step of decoding a binary signal inputted from the binary signal generating step and outputting the predetermined data. When a symbol of $\pm(2^{(n+1)}-1)$ is outputted from the symbol converting step, a frequency shift of a signal outputted from the frequency shifting and modulating step is set to take a value in a range of ±0.822 [kHz] to ±0.952 [kHz].

BRIEF DESCRIPTION OF THE DRAWINGS

FIG. 19 is a block diagram showing a constitution of a ground mobile communication system according to a modification of the invention.

BEST MODE FOR CARRYING OUT THE INVENTION

Embodiments of the invention will be hereinafter explained in detail with reference to the drawings.

As described above, it is impossible to adapt an emission spectrum to an emission mask (mask E) simply by halving parameters such as a transmission rate and a frequency shift of a modulation system currently applied to an LMR system applicable to a channel spacing of 12.5 kHz. It is realistically difficult to use a linear modulation system represented by a P25-P2 modulation system because of cost and the like.

Thus, in the embodiments described below, parameters such as a transmission rate and a frequency shift that can realize an LMR system conforming to the FCC rule to be enforced in 2005 by adopting a nonlinear modulation system represented by a four-level FSK modulation system will be examined.

It is known that a spectrum of an FM modulation wave at the time when a modulation signal is a sine wave is represented by a Bessel function indicated by Expression (1) below.

$$\phi FM(t) = A[J0(mf)\cos \omega_c t + J1(mf)\{\cos(\omega_c+\omega_m)t - \cos(\omega_c-\omega_m)t\} + J2(mf)\{\cos(\omega_c+2\omega_m)t - \cos(\omega_c-2\omega_m)t\} + J3(mf)\{\cos(\omega_c+3\omega_m)t - \cos(\omega_c-3\omega_m)t\} + \ldots] \quad (1)$$

where, $\omega_c$ is a frequency of a carrier wave, $\omega_m$ is a modulated frequency, $mf$ is a modulation index (a frequency shift/a modulation frequency), and $Jn(mf)$ is a Bessel function of the first kind for an nth order component.

Figure 1:
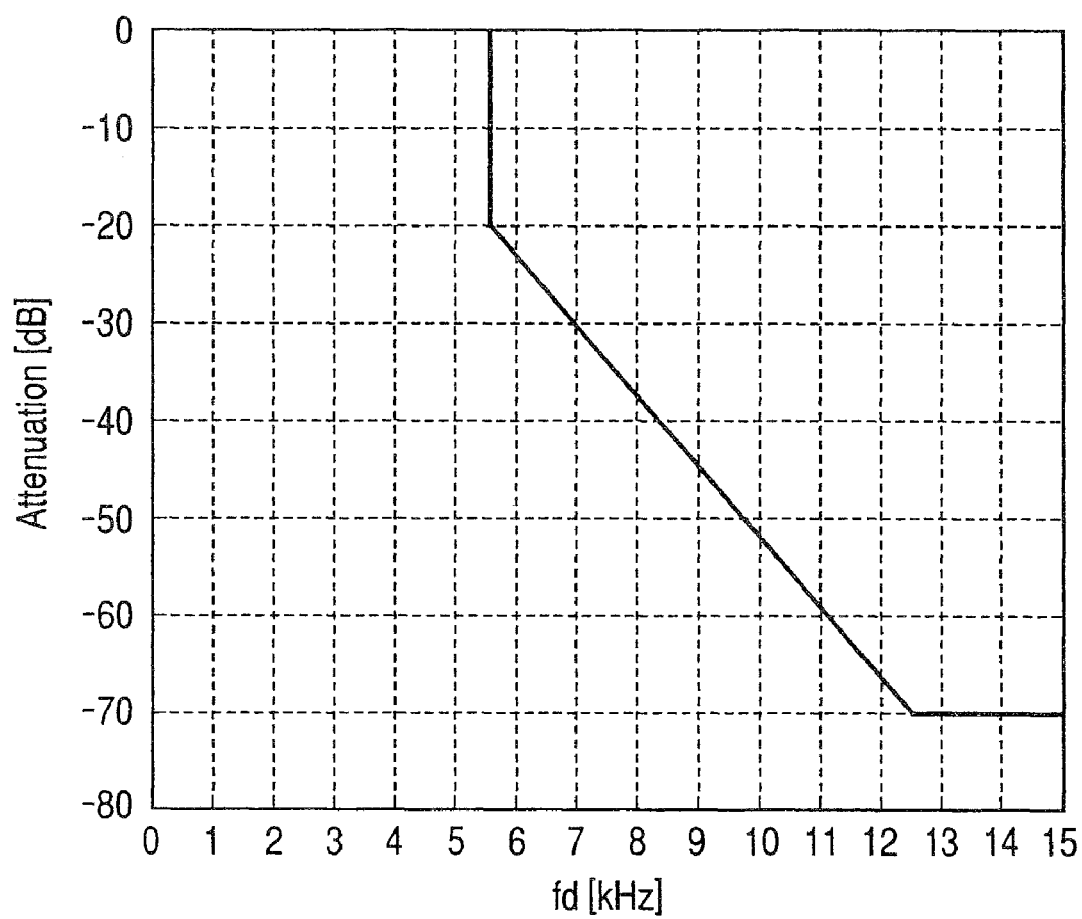
FIG. 1 is a graph showing a characteristic of a mask D.
Figure 2:
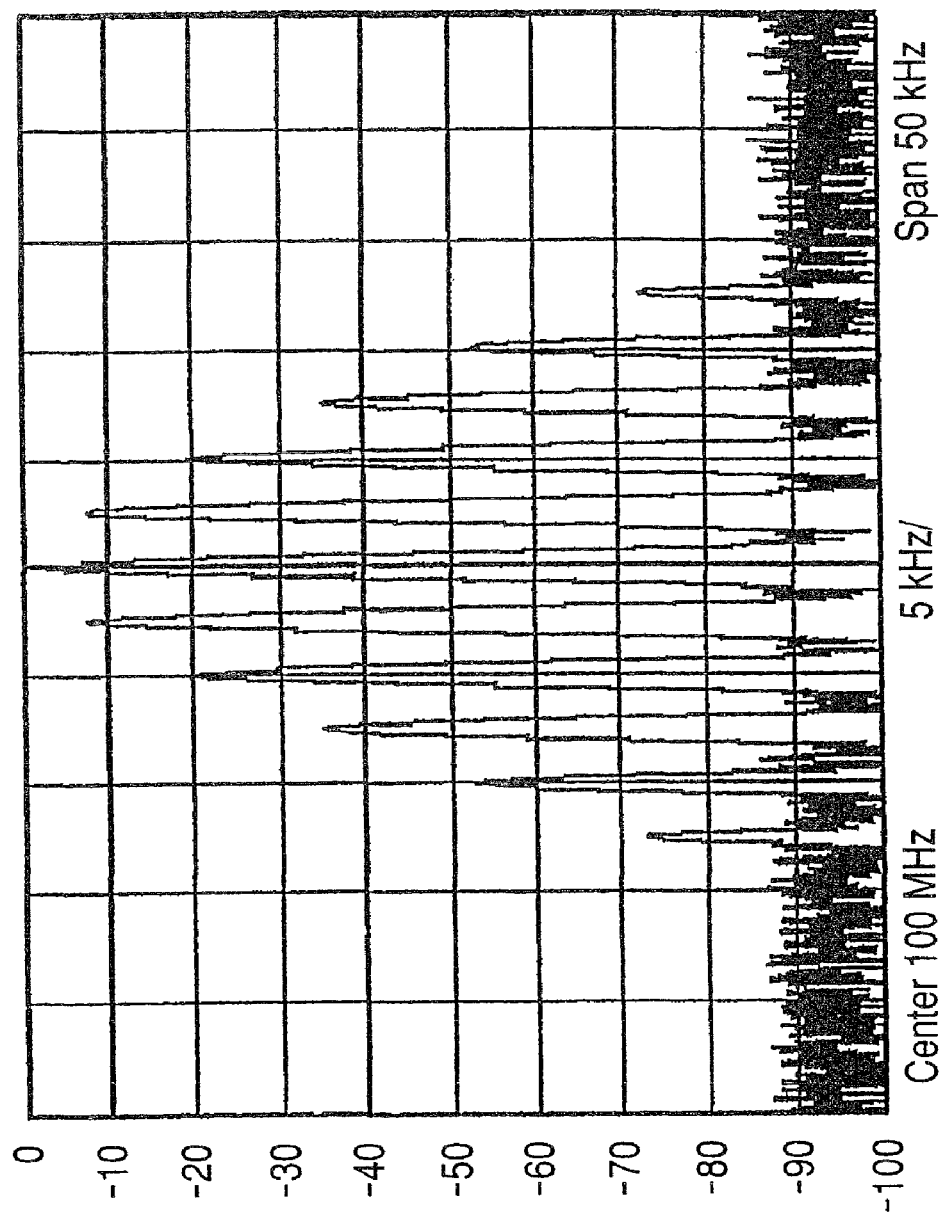
FIG. 2 is a graph showing a waveform of an emission spectrum in the case in which an analog FM modulation system is used and the mask D.

Correlation between the emission spectrum shown in FIG. 2 and the Bessel function indicated by Expression (1) is calculated. Since a modulation frequency is 2.5 kHz and a frequency shift is a 2.5 kHz shift, the modulation index $mf$ is 1. When primary to four-level components are calculated according to the Bessel function, the following levels are obtained.

(Primary)=$J1(1)$=−7.13 dB (Secondary)=$J2(1)$=−18.79 dB (Third-order)=$J3(1)$=−34.17 dB (Fourth-order)=$J4(1)$=−52.12 dB When these values and values of peak spectra generated at frequencies integer times as high as 2.5 kHz in FIG. 2 are compared, errors thereof are within a range of ±1 dB. Therefore, a mission spectrum of an FM modulation wave using a sine wave for a modulation signal may be calculated by Expression (1).

Figure 5:
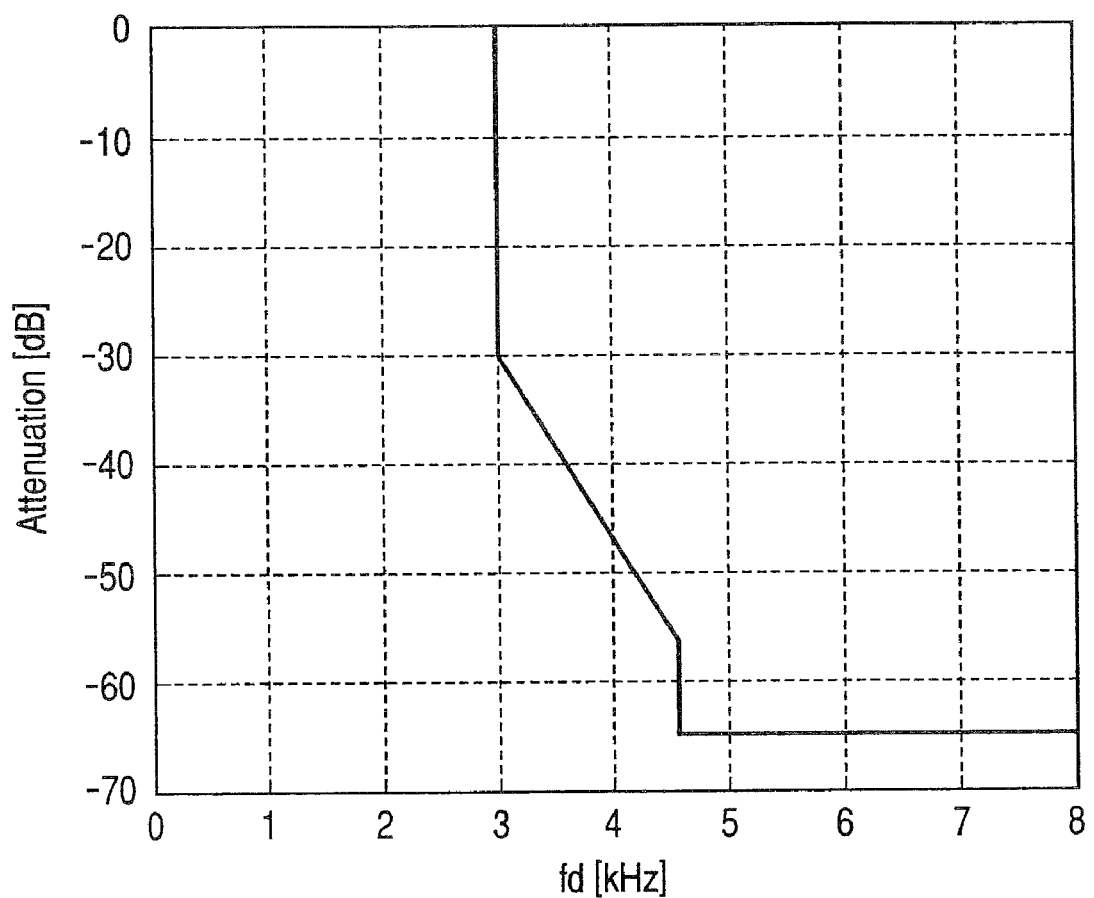
FIG. 5 is a graph showing a characteristic of a mask E.
Figure 6:
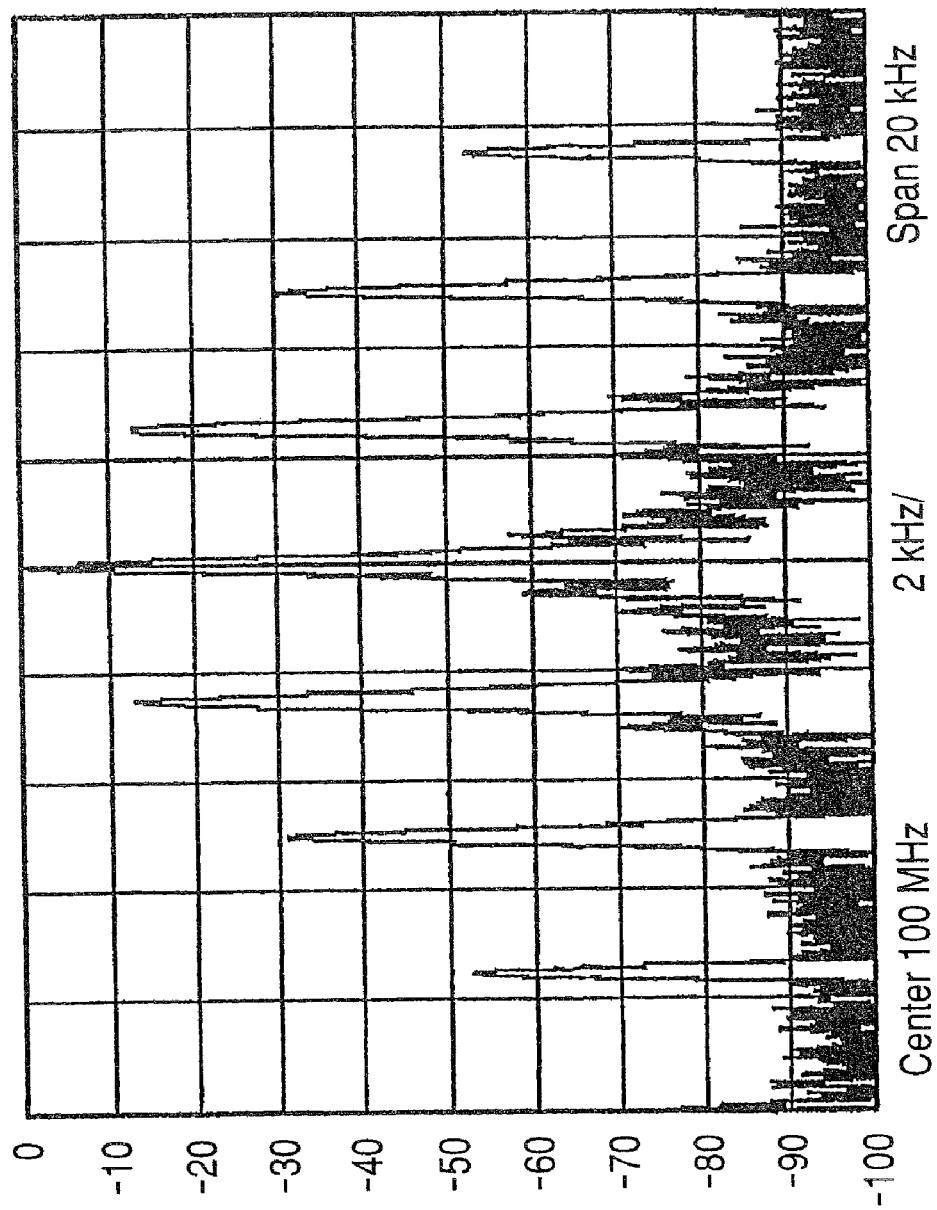
FIG. 6 is a graph showing a waveform of an emission spectrum in the case in which the analog FM modulation system is used and the mask E.
Figure 7:
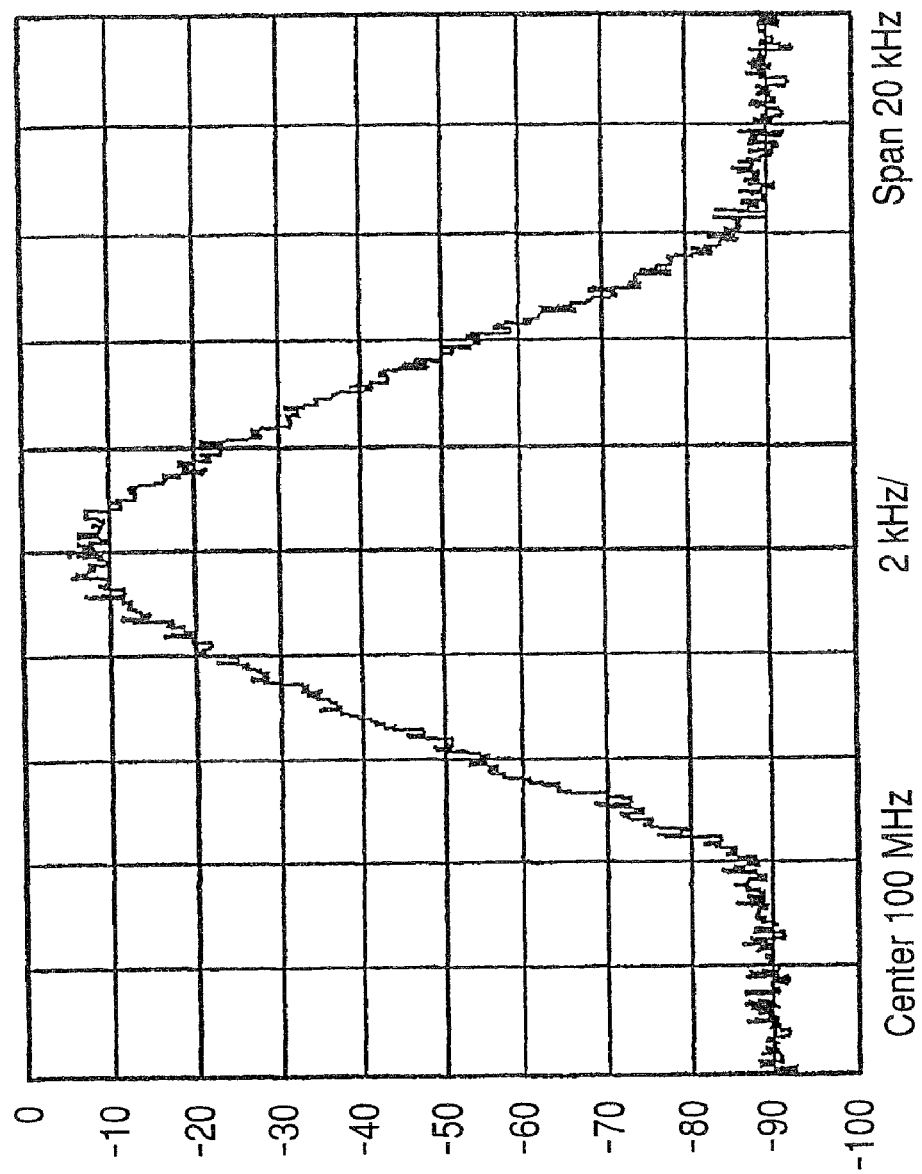
FIG. 7 is a graph showing a waveform of an emission spectrum in the case in which a transmission rate and a frequency shift in the P25-P1 modulation system are halved and pseudo-random data is modulated and the mask E.
Figure 8:
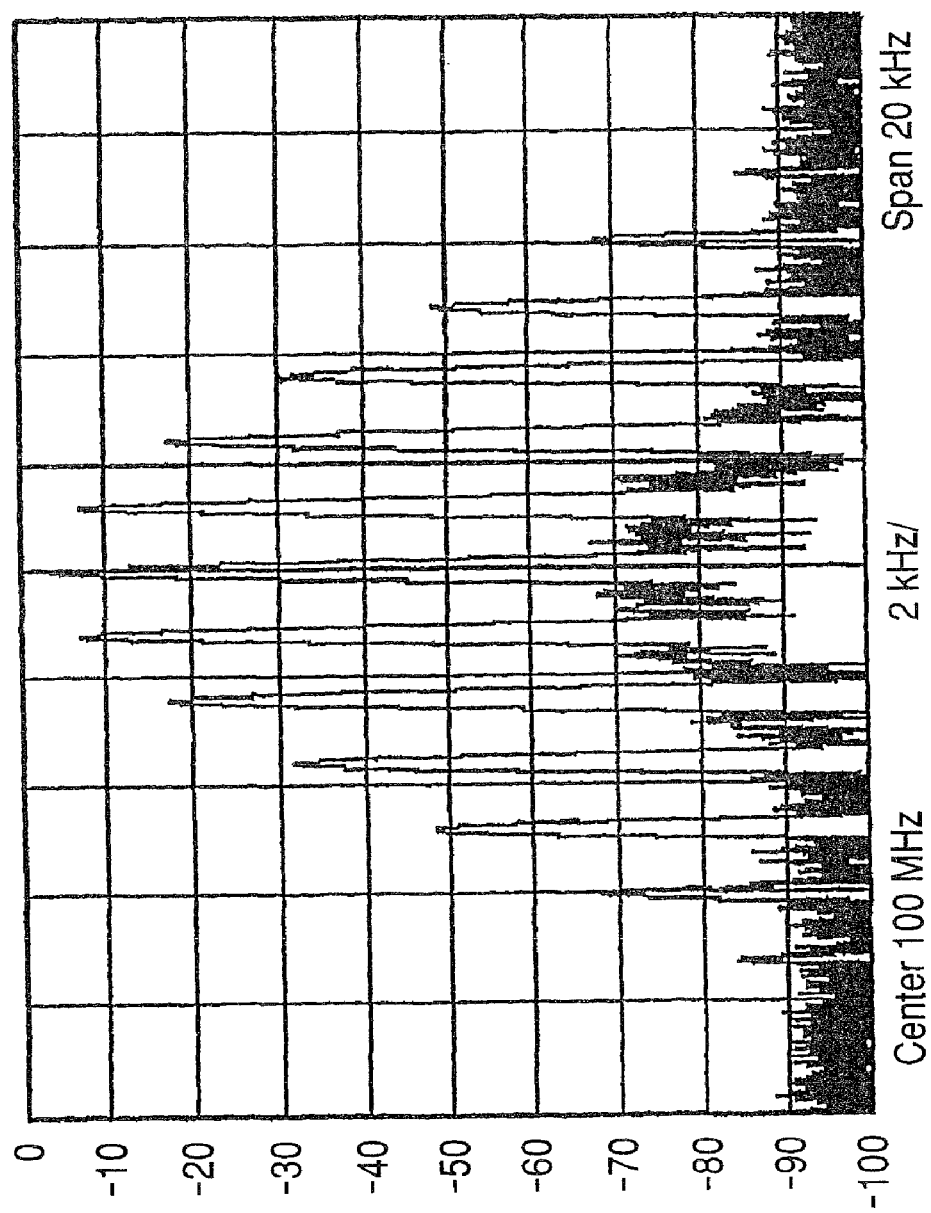
FIG. 8 is a graph showing a waveform of an emission spectrum in the case in which a transmission rate and a frequency shift in the P25-P1 modulation system are halved and symbols of ±3 are alternately generated and the mask E.
Figure 9:
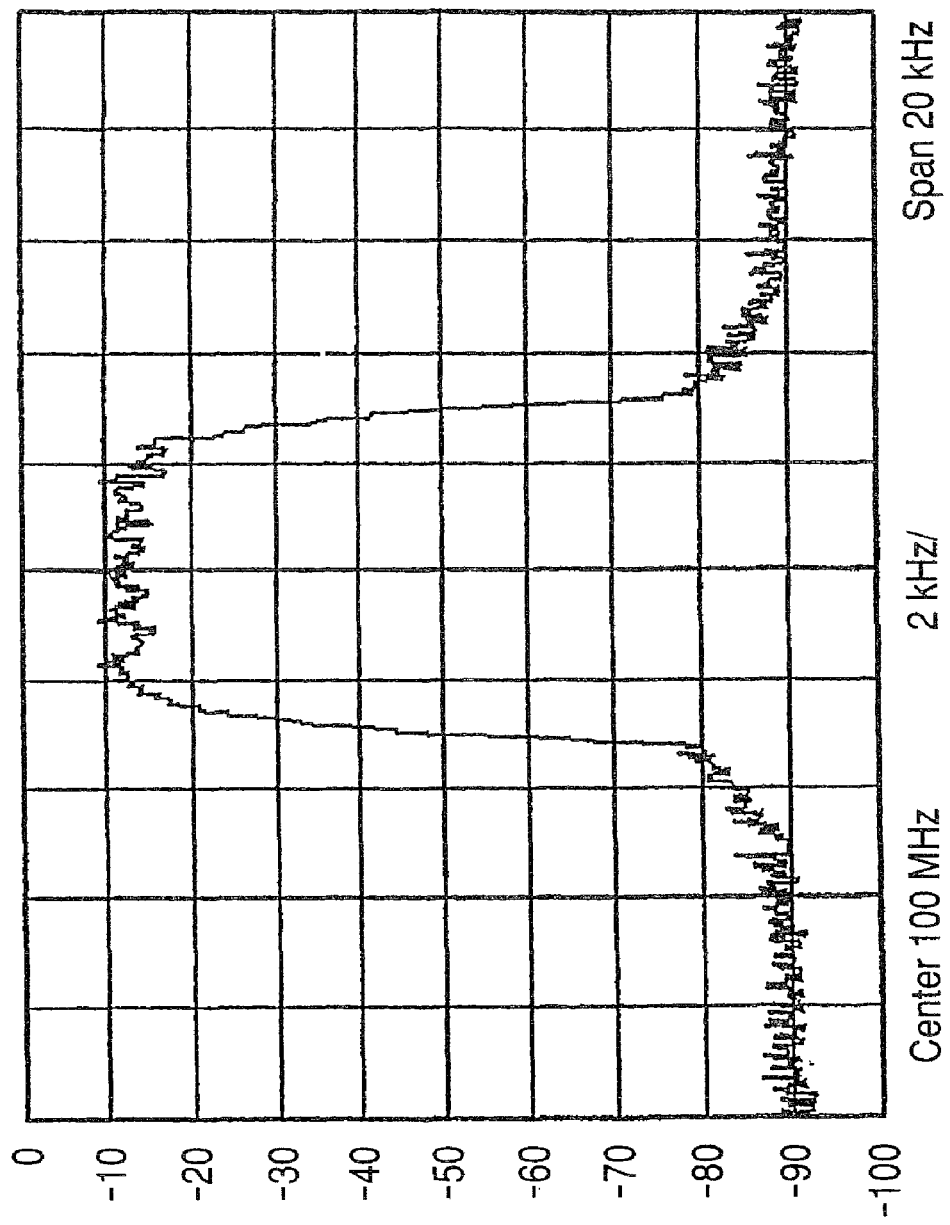
FIG. 9 is a graph showing a waveform of an emission spectrum in the case in which pseudo-random data is modulated in a P25-P2 modulation system and the mask E.

A frequency shift conforming to this mask is calculated backward from a value of the mask E stipulated in the FCC rule. A stipulated level of the mask E in the secondary component is calculated as −65 dB from FIG. 5. A modulation index $mf$ for setting an emission spectrum to be equal to or lower than this level is calculated as 0.067 by backward calculation. A frequency shift in this case is an extremely small value of 0.067×2.5=0.167 kHz.

A general S/N (Signal/Noise) of an LMR system that is applicable to the channel spacing of 12.5 kHz and uses the frequency shift of 2.5 kHz is about 45 dB. When the frequency shift is halved, the S/N falls by 6 dB. Thus, an S/N at the time when a frequency shift is 0.167 kHz is calculated as 45+20×log10 (0.167/2.5)=21.5 dB. This clearly indicates performance that cannot stand a practical use.

Consequently, although it is possible to adopt a frequency shift by reducing the frequency shift using the analog FM modulation, since performance cannot be permitted in terms of a practical use, this method is excluded from an object of examination.

A condition under which the LMR system adopting the four-level FSK modulation system conforms to the FCC rule to be enforced in 2005 will be explained.

Figure 3:
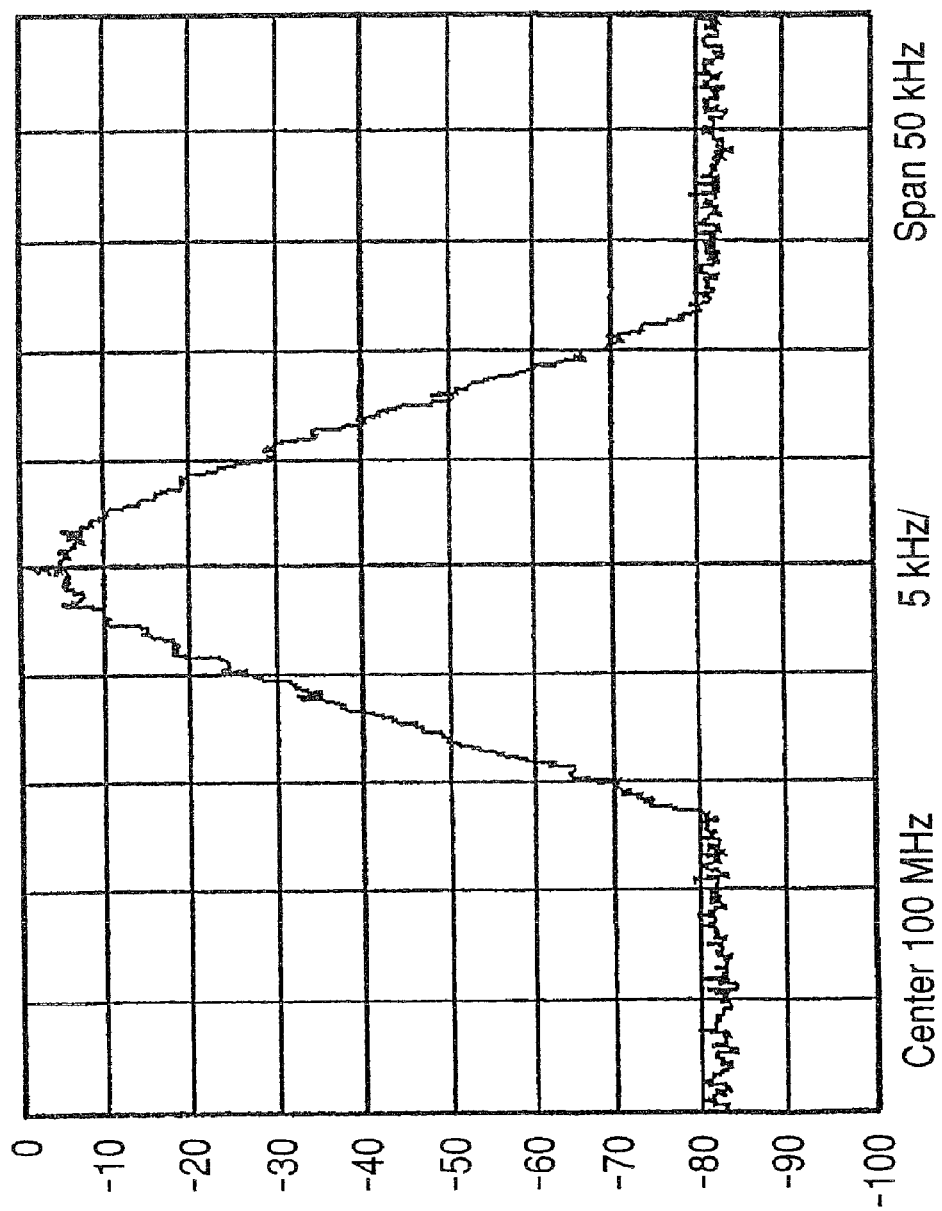
FIG. 3 is a graph showing a waveform of an emission spectrum in the case in which pseudo-random data is converted in a P25-P1 modulation system and the mask D.
Figure 4:
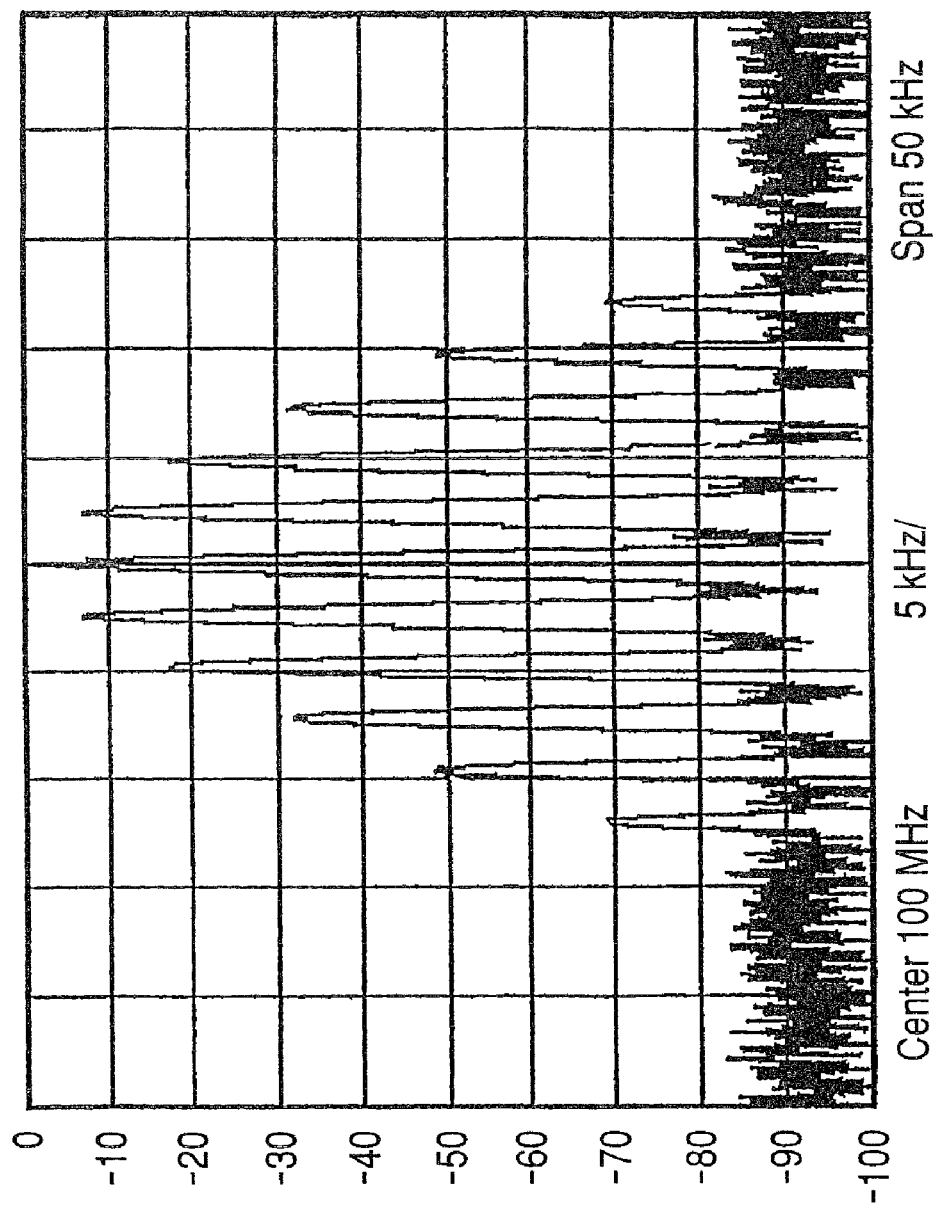
FIG. 4 is a graph showing a waveform of an emission spectrum in the case in which symbols of ±3 are alternately generated in the P25-P1 modulation system and the mask D.

In FIGS. 3 and 4, an emission spectrum in the case in which the P25-P1 modulation system is adopted is shown. In the case of digital modulation, a spectrum of a modulation wave is different depending on a characteristic of a data sequence used. As is evident from FIGS. 3 and 4, if random data is used, the spectrum disperses and average energy per unit frequency decreases. Thus, the spectrum is seemingly narrowed. In repetition of specific data, an emission spectrum is equivalent to a spectrum subjected to modulation with a sine wave. Since energy concentrates on components integer times as large as the sine wave, a wide spectrum is obtained. Therefore, a worst condition in the four-level FSK modulation is a condition at the time when symbols of +3 and −3 with a wider frequency shift are used and the symbols are alternately repeated to subject an emission spectrum to modulation with a sine wave equal to a frequency half as high as a symbol rate.

As described above, the FCC rule to be enforced in 2005 provides, as a condition, that an emission spectrum be adapted to the mask E and that, in performing transmission of data, an LMR system have a transmission rate equal to or higher than 4800 bps per 6.25 kHz band. Thus, a frequency shift for adapting an emission spectrum to the mask E at the time when the four-level FSK modulation system is used at a transmission rate of 4800 bps is calculated backward. In this case, since a symbol rate is 2400 symbol/s that is half the transmission rate of 4800 bps. Thus, by repeating symbols of +3 and −3, an emission spectrum is equivalently a sine wave of 1.2 kHz.

When a standard value of the mask E and a value of a spectrum integer times as large as 1.2 kHz are compared, a fourth order is most strict in terms of a condition. If this condition is satisfied, it is possible to adapt the emission spectrum to the mask E. In this case, the modulation index mf is 0.685 and a frequency shift takes a value indicated by Expression (2) below.

$$0.685 \times 1.2 = 0.822 \text{ kHz} \quad (2)$$

As described above, the emission spectrum shown in FIG. 4 does not conform to the mask D. The emission spectrum shown in FIG. 4 is measured under the worst condition in the P25-P1 modulation system. Following this example, an emission spectrum does not have to conform to an emission mask under the worst condition. In an actual state of use in which a sound signal is digitized and transmitted, since a data sequence shows a random characteristic, a spectrum in the actual state of use has a characteristic substantially the same as that at the time when pseudo-random data is modulated. Therefore, under the worst condition, nonconformity may be allowed to some extent. An emission spectrum only has to completely conform to an emission mask when the pseudo-random data is used.

Levels of respective peak spectra under the worst condition at the time when the P25-P1 modulation system is adopted are calculated from the Bessel function. A degree of deviation of a spectrum from the mask D is calculated.

The base band filter represented by Table 3 includes a raised cosine filter and a shaping filter. A characteristic of this shaping filter is equal to a characteristic opposite to a characteristic of sinc(sin(x)/x) in which an amplitude is 1 at a frequency of 0 and is 0 at a symbol frequency. Nominal frequency shifts in the symbols of +3 and −3 are +1.8 kHz and −1.8 kHz, respectively. In the raised cosine filter, since intersymbol interference does not occur, an amplitude of a symbol at a filter output does not change. Therefore, frequency shifts at the time when the symbols of +3 and −3 are alternately sent are equal to the nominal frequency shifts when only the raised cosine filter is used. Since a frequency characteristic of the shaping filter is equal to a characteristic opposite to that of sinc, the frequency characteristic is indicated by Expression (3) below.

$$\text{(Characteristic of the shaping filter)} = \frac{1}{\text{sinc}} = \frac{f\pi/4.8}{\sin(f\pi/4.8)} \quad (3)$$

When the symbols of +3 and −3 are repeated, a frequency f is 2.4 kHz. When the frequency f is substituted in Expression (3), a characteristic of the shaping filter is π/2. Since an actual frequency shift changes by a degree equivalent to the characteristic of the shaping filter (=π/2) from the nominal frequency shifts, an actual frequency shift of the filter including the raised cosine filter and the shaping filter is 1.8 kHz×π/2=2.827 kHz. Values of the Bessel function at the time when a modulation frequency is set to 2.4 kHz and a frequency shift is set to 2.827 kHz and values of the mask D calculated from Table 1 are shown in Table 6 below.

TABLE 6

| Order | Frequency | Standard Value of Mask D | Bessel Function Value |
|---|---|---|---|
| 1 | 2.4 kHz | 0 dB | −6.15 dB |
| 2 | 4.8 kHz | 0 dB | −16.25 dB |
| 3 | 7.2 kHz | −31.41 dB | −30.11 dB |
| 4 | 9.6 kHz | −48.85 dB | −46.60 dB |
| 5 | 12.0 kHz | −66.30 dB | −65.07 dB |

As shown in Table 6, in components of third order and higher orders, values of the Bessel function are below the standard by about 1 dB to 2 dB. When the values of the Bessel function shown in Table 6 and the values of the respective peak spectra shown in FIG. 4 are compared, although there is a slight error, the values of the Bessel function and the values of the peak spectra are substantially correlated. Therefore, since the frequency shift 0.822 kHz indicated by Expression (2) is a frequency shift completely conforming to the mask E under the worst condition, if a slight fall below the standard is allowed under the worst condition as in the P25-P1 modulation system, a frequency shift equal to or larger than 0.822 kHz may be used. Taking into account the fact that an error rate in the FSK modulation system such as the P25-P1 modulation system depends on a frequency shift, it is advisable to set the frequency shift as large as possible. Thus, a value of a spectrum having a frequency integer times as large as 1.2 kHz calculated from the Bessel function and the standard value of the mask E are compared and, when an emission spectrum does not conform to the mask E under the worst condition but pseudo-random data is used, the modulation index mf conforming to the mask E is 0.793 and a frequency shift takes a value indicated by Expression (4) below.

$$0.793 \times 1.2 = 0.952 \text{ kHz} \quad (4)$$

Values of the Bessel function at the time when a modulation frequency is set to 1.2 kHz and a frequency shift is set to 0.952 kHz and values of the mask E calculated from Table 4 are shown in Table 7 below.

TABLE 7

| Order | Frequency | Standard Value of Mask E | Bessel Function Value |
|---|---|---|---|
| 1 | 1.2 kHz | 0 dB | −8.72 dB |
| 2 | 2.4 kHz | 0 dB | −22.54 dB |
| 3 | 3.6 kHz | −40.0 dB | −40.00 dB |
| 4 | 4.8 kHz | −65.0 dB | −60.00 dB |

The modulation index mf=0.793 is a modulation index at which a standard value of the mask E and a value of the Bessel function are the same in the third-order component. In the fourth-order component, a value of the Bessel function is below a standard value of the mask E by 5 dB. As shown in Table 4, in a frequency band of fd>4.6 kHz, a standard value of the mask E changes according to a value of a transmission power P. When the transmission power P is equal to or higher than 10 W, a standard value is −65 dB. When the transmission power P is 5 W, a standard value is −62 dB. In general, in a portable radio apparatus, a transmission power is 5 W and, under this condition, a value of the Bessel function is below a standard value of the mask E by 3 dB. When the fall below the standard value of this degree is not significantly different from the fall below the standard with respect to the mask D in the case in which the P25-P1 modulation system is adopted shown in Table 6. Thus, it can be said that the fall below the standard is within a tolerance as in the case of the mask D.

In the above explanation, a maximum frequency shift for adapting an emission spectrum to the mask E at the time when the four-level FSK is used at the transmission rate of 4800 bps is calculated. When digital data is modulated, it is a well-known fact that a waveform is shaped using a base band filter. An error rate is affected by a base band filter used. As indicated by Expression (3), an actual frequency shift outputted from a modulator changes depending on a base band filter. Thus, nominal frequency shifts at the symbol levels of +3 and −3 obtained by calculating backward the maximum frequency shift 0.952 kHz indicated by Expression (4) are different.

It is a general practice to use a Nyquist transmission path as a transmission path in order to hold down an error rate. Therefore, in this embodiment, a Nyquist filter is used in a base band filter. An FM modulator and an FM demodulator have transparency as long as distortion does not occur. Thus, in order to form a Nyquist transmission path, the Nyquist filter only has to be arranged at a pre-stage of the FM modulator or a post stage of the FM demodulator such that the base band filter has a Nyquist characteristic. Since the shaping filter and the integrate and dump filter described in Table 3 have opposite frequency characteristics, it can be understood that, if the modulator and the demodulator are integrated, only the raised cosine filter is left and that the Nyquist transmission path is formed.

As described above, it is a necessary condition that a Nyquist filter is used in order to reduce an error rate. In addition, a nominal frequency shift at which an actual frequency shift of 0.952 kHz is obtained is different depending on a Nyquist filter used. Therefore, it is necessary to select a Nyquist filter with which a largest nominal frequency shift is obtained. In general, a filter having a raised cosine characteristic is used as a Nyquist filter. Combinations of filters in, this case are shown in Table 8 below.

TABLE 8

| Combination | Transmission Side | Reception Side |
|---|---|---|
| I | Raised Cosine | None |
| II | Raised Cosine + 1/sinc | sinc |
| III | None | Raised Cosine |
| IV | sinc | Raised Cosine + 1/sinc |
| V | Root Raised Cosine | Root Raised Cosine |
| VI | Root Raised Cosine + 1/sinc | Root Raised Cosine + sinc |
| VII | Root Raised Cosine + sinc | Root Raised Cosine + 1/sinc |

Since a 1/sinc filter has a characteristic opposite to that of a sinc filter, the 1/sinc filter has a diverging frequency characteristic. Therefore, it is impossible to use the 1/sinc filter alone and a combination using only the 1/sinc filter is excluded. When no filter is provided on the reception side, since band limitation is not applied to noise and an S/N is deteriorated, an error rate extremely worsens. When no filter is provided on the transmission side, a rectangular wave is directly subjected to FM modulation. A spectrum expands infinitely and does not conform to the mask E. Consequently, among the combinations, the combination I and the combination III are excluded from objects. Since the combination IV only has the sinc filter on the transmission side, band limitation is loose and spread of a spectrum is relatively large. Thus, the combination IV is also excluded from objects. Therefore, the four kinds of combinations II, V, VI, and VII are left as candidates.

A nominal frequency shift for setting an actual maximum frequency shift to 0.952 kHz when the candidate filters are used is calculated. A symbol rate is 2400 symbol/s and, in repetition of the symbols of +3 and −3, a spectrum is a sine wave of a frequency 1.2 kHz. When the raised cosine filter is used, a nominal frequency shift and an actual frequency shift are equal. When amplitudes in the respective filters at the frequency 1.2 kHz are calculated with an amplitude in this case as a reference value, the amplitudes are calculated as indicated by Expressions (5), (6), and (7) below.

$$\text{(Amplitude of Raised Cosine)} = 0.5 \text{ (Reference value)} \tag{5}$$

$$\text{(Amplitude of Root Raised Cosine)} = \sqrt{0.5} \tag{6}$$

$$\text{(Amplitude of sinc)} = \frac{\sin(\pi \times 1.2/2.4)}{(\pi \times 1.2/2.4)} = \frac{2}{\pi} \tag{7}$$

From these expressions, amplitude scaling factors based on an amplitude in the raised cosine filter at 1.2 kHz of the four kinds of candidate filters are indicated by Expressions (8), (9), (10), and (11) below.

$$\text{Candidate II: (Amplitude of Raised Cosine+1/sinc)} = 1/(2/\pi) = \pi/2 \tag{8}$$

$$\text{Candidate V: (Amplitude of Root Raised Cosine)} = \sqrt{0.5}/0.5 = \sqrt{2} \tag{9}$$

$$\text{Candidate VI: (Amplitude of Root Raised Cosine+1/sinc)} = \sqrt{2} \times \pi/2 = \pi/\sqrt{2} \tag{10}$$

$$\text{Candidate VII: (Amplitude of Root Raised Cosine+sinc)} = \sqrt{2} \times 2/\pi \tag{11}$$

In order to set an actual maximum frequency shift to 0.952 kHz, nominal frequency shifts in the respective candidate filters are calculated as indicated by Expressions (12), (13), (14), and (15).

$$\text{Candidate II: (Shift of Raised Cosine+1/sinc)} = 0.952/(\pi/2) = 0.6061 \text{ kHz} \tag{12}$$

$$\text{Candidate V: (Shift of Root Raised Cosine)} = 0.952/\sqrt{2} = 0.6732 \text{ kHz} \tag{13}$$

$$\text{Candidate VI: (Shift of Root Raised Cosine+1/sinc)} = 0.952/(\pi/\sqrt{2}) = 0.4286 \text{ kHz} \tag{14}$$

$$\text{Candidate VII: (Shift of Root Raised Cosine+sinc)} = 0.952/(\sqrt{2} \times 2/\pi) = 1.0574 \text{ kHz} \tag{15}$$

In the FSK modulation system, since an error rate is lower when a frequency shift is larger, a filter having a larger nominal frequency shift shows a better characteristic. Considering the reception side, a filter with strong band limitation on noise has a better S/N and, as a result, has a lower error rate. In the candidate VI, although band limitation on the reception side is strong, since a nominal frequency shift is extremely small, an overall error rate is deteriorated. In the candidate II, since a nominal frequency shift is the second lowest and band limit on the reception side is the loosest, an error rate is also deteriorated. A result obtained by calculating an error rate by applying the nominal frequency shifts of the filters calculated in Expressions (12) to (15) is shown in FIG. 10.

Figure 10:
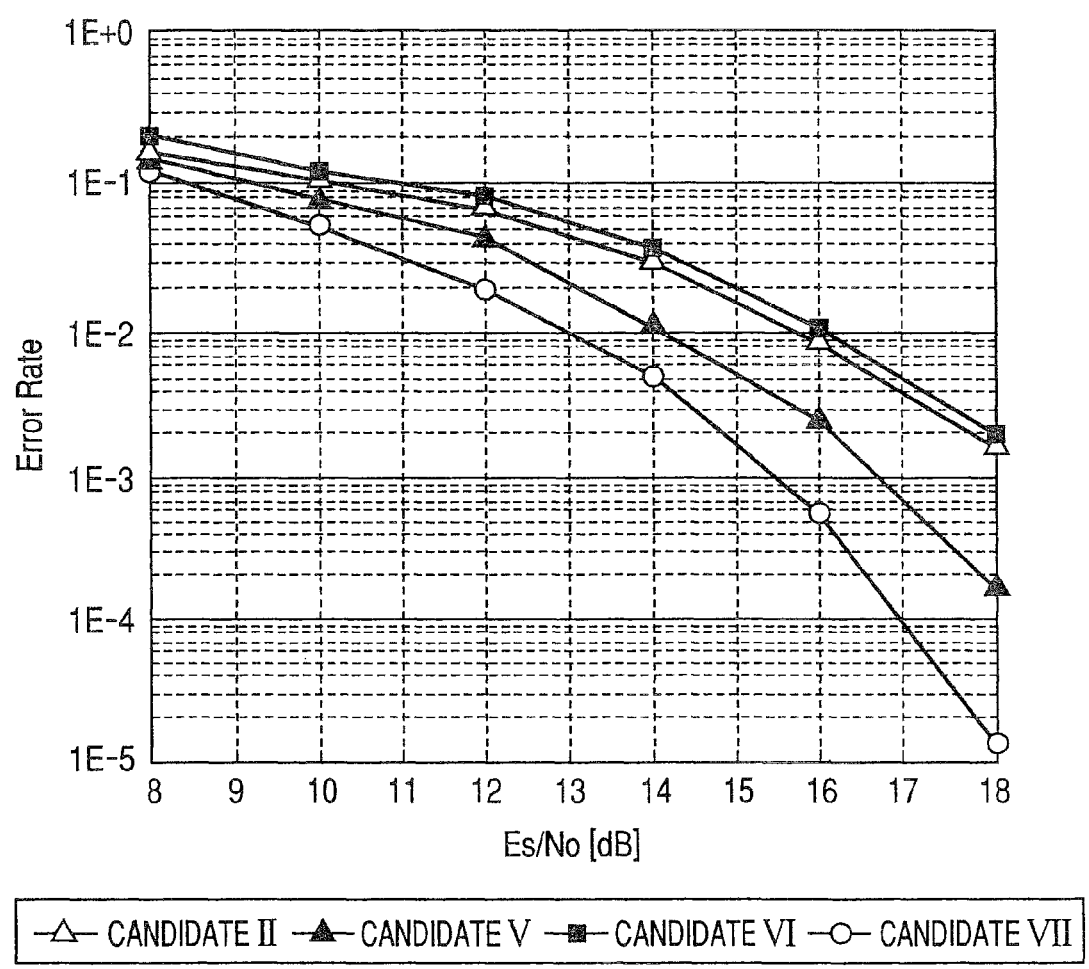
FIG. 10 is a graph showing an error rate characteristic in the case in which respective candidate filters are used.
Figure 11:
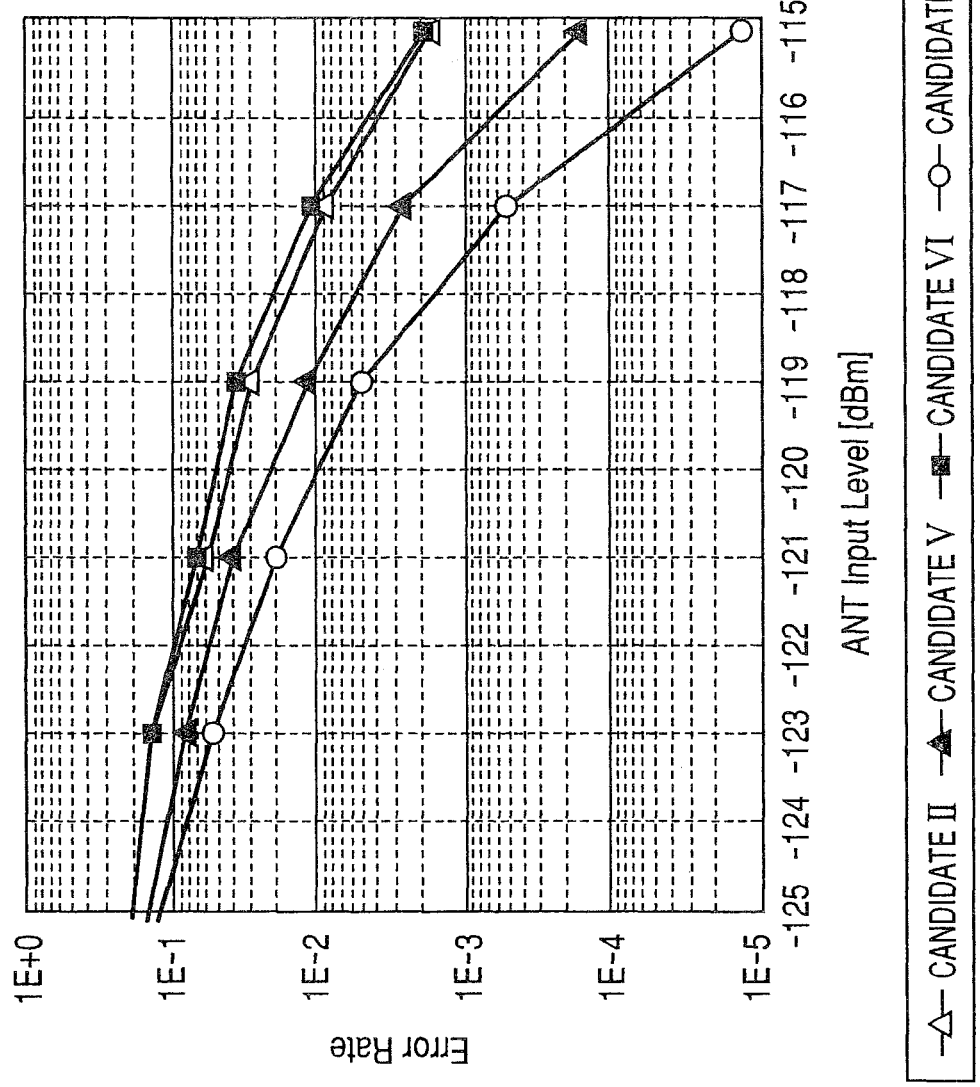
FIG. 11 is a graph showing an error rate characteristic in the case in which respective candidate filters are used.

According to the result shown in FIG. 10, it is proved that the above judgment is correct. The best error rate is indicated when the base band filter of the candidate VII is used. The second best error rate is indicated when the base band filter of the candidate V is used. A C/N is calculated from the result shown in FIG. 10 and an error rate with respect to an input level of a receiver at the time when a noise index of the receiver is assumed to be 7 dB is calculated and shown in FIG. 11. When it is assumed that a reference sensitivity has an error rate of 3%, in the candidate VII, −122 dBm is an input level at which the reference sensitivity is obtained. The FCC rule provides that a reference sensitivity should be set to 12 dBSINAD when the analog FM modulation system is used in the LMR system applicable to the channel spacing of 12.5 kHz. In a receiver having a noise index of 7 dB, an input level at which a reception sensitivity of 12 dBSINAD can be obtained is about −120 dBm. When this reception sensitivity of dBSINAD and the candidate VII are compared, as shown in FIG. 11, the candidate VII has a sensitivity better than the reception sensitivity by about 2 dB. In the candidate V, the error rate of 3% is obtained by −120.5 dBm. The candidate V has a reference sensitivity equal to that in the case in which the conventional analog FM modulation system is used.

From the above description, a minimum value of a frequency shift for completely adapting a range of actual frequency shifts that can be taken to the mask E is 0.822 kHz indicated by Expression (2) and a maximum value thereof is 0.952 kHz indicated by Expression (4). It is possible to obtain a modulation system conforming to the FCC rule to be enforced in 2005 by calculating nominal frequency shifts of the candidates V and VII using Expressions (9) and (11). On the basis of these facts, embodiments will be explained.

[First Embodiment]

First, a transmission rate, a symbol rate, a base band filter, a modulation system, and a nominal frequency shift in the first embodiment are shown in Table 9 below.

TABLE 9

| Transmission Rate | 4800 bps |
|---|---|
| Symbol Rate | 2400 symbol/s |
| Base Band Filter | Transmission: A filter obtained by combining a filter having a Root Raised Cosine characteristic with an arbitrary α and a filter having a sinc function characteristic |
| | Reception: A filter obtained by combining a filter having a Root Raised Cosine characteristic with an arbitrary α and a filter having a 1/sinc function characteristic |
| Modulation System | Four-Level FSK Modulation System |
| Nominal Frequency Shift | Arbitrary in ranges +3 = +913 Hz to +1057 Hz and −3 = −913 Hz to −1057 Hz with respect to respective four symbol levels (±3, ±1) +1 and −1 are shifts 1/3 of +3 and −3, respectively |

Figure 12:
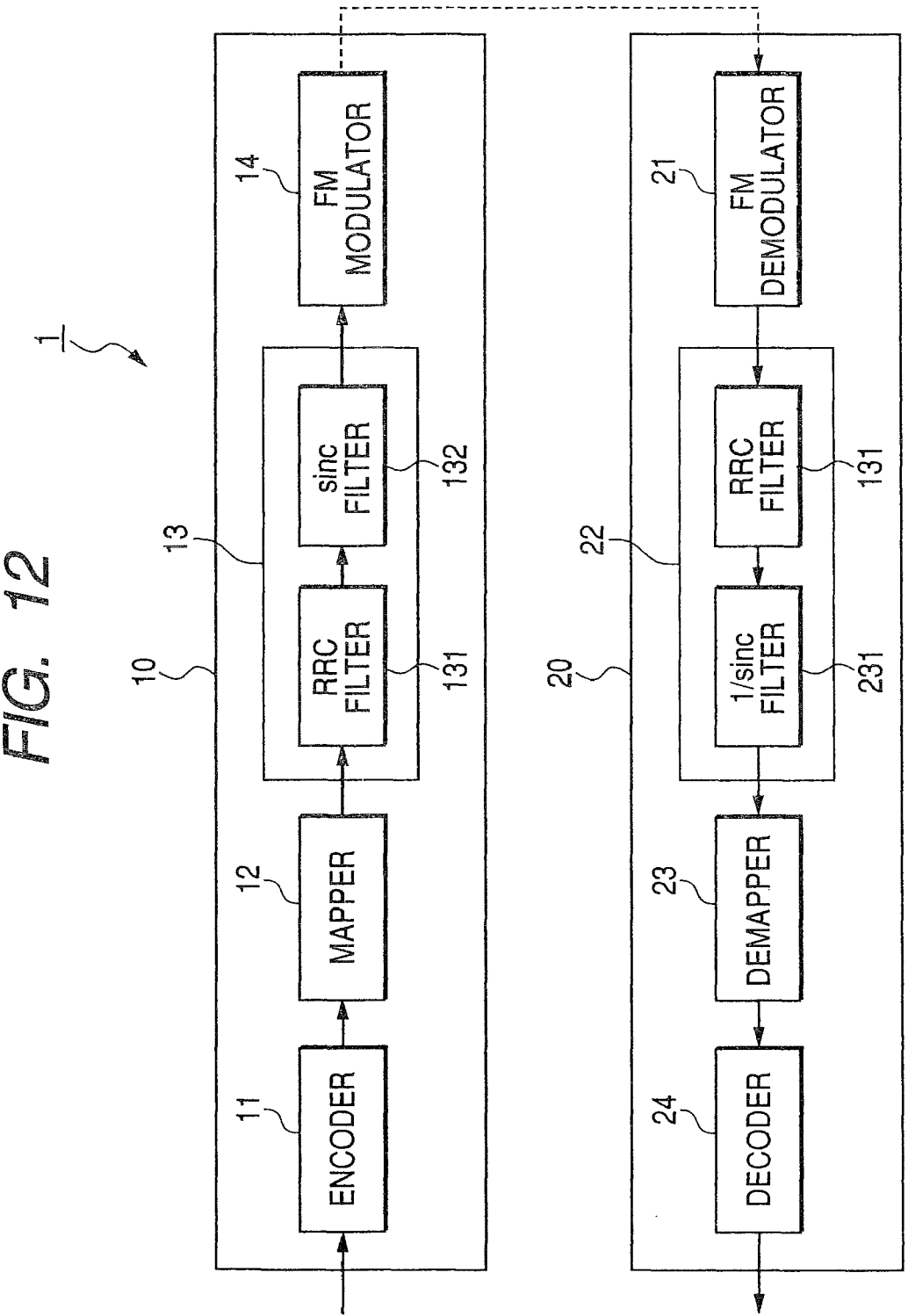
FIG. 12 is a block diagram showing a constitution of a ground mobile communication system according to a first embodiment of the invention.

FIG. 12 is a block diagram showing a constitution of a ground mobile communication system 1 according to the first embodiment of the invention. The ground mobile communication system 1 schematically includes a transmitting unit 10 and a receiving unit 20 and performs transmission and reception of data at a transmission rate of 4800 bps.

In the ground mobile communication system 1, as a nominal frequency shift, a predetermined value of ±913 kHz to ±1057 kHz is set with respect to a symbol level ±3 and a value 1/3 of the predetermined value is set with respect to a symbol level ±1. This nominal frequency shift is a frequency that shifts when a symbol outputted from a mapper 12 described later is inputted to an FM modulator 14 without intervention of a base band filter 13.

The transmitting unit 10 includes an encoder 11, the mapper 12, the base band filter 13, and the FM modulator 14.

The encoder 11 applies predetermined format processing such as encoding processing, error correction code addition processing, and synchronous code addition processing to sound data, character data, and the like to generate a binary signal and supplies the binary signal generated to the mapper 12.

The mapper 12 sequentially converts a binary signal sequentially inputted from the encoder 11 into four-level symbols (±3, ±1) two bits at a time and supplies the four-level symbols to the base band filter 13. This symbol is a rectangular voltage signal having a width of a predetermined symbol time. In this embodiment, since a transmission rate is 4800 bps, a symbol rate is 2400 symbol/s and a frequency of a symbol sequence at the time when symbols of +3 and −3 are alternately outputted from the mapper 12 is 1.2 kHz.

The base band filter 13 includes a Nyquist filter. The base band filter 13 blocks a predetermined frequency component of a symbol inputted from the mapper 12 and outputs a waveform signal. In this embodiment, the base band filter 13 includes a root raised cosine filter 131 and a sine filter 132.

When a frequency of an inputted rectangular signal is 1.2 kHz, the root raised cosine filter 131 outputs a waveform signal having an amplitude $\sqrt{2}$ times as large as that of this rectangular signal. When a frequency of an inputted rectangular signal is 1.2 kHz, the sinc filter 132 outputs a waveform signal having an amplitude $2/\pi$ times as large as that of this rectangular signal.

In other words, the base band filter 13 in this embodiment shapes a rectangular symbol with a frequency of 1.2 kHz inputted from the mapper 12 into a waveform signal having an amplitude $2\sqrt{2}/\pi$ times as large as that of the symbol and outputs the waveform signal.

The FM modulator 14 shifts a frequency of a signal transmitted to the receiving unit 20 according to a magnitude of an amplitude of a waveform signal outputted from the base band filter 13 to thereby modulate the frequency (FM modulation).

To explain the above more in detail, when a level of a symbol outputted from the mapper 12 is +3, the FM modulator 14 shifts a frequency of a signal to be transmitted by $+\Delta f (+0.822$ kHz$\leq \Delta f \leq +0.952$ kHz$)$. When a symbol level is −3, the FM modulator 14 shifts a frequency of a signal to be transmitted by $-\Delta f (-0.822$ kHz$\leq \Delta f \leq -0.952$ kHz$)$. When a symbol level is +1, the FM modulator 14 shifts a frequency of a signal to be transmitted by $+\Delta f/3$. When a symbol level is −1, the FM modulator 14 shifts a frequency of a signal to be transmitted by $-\Delta f$.

The FM modulator 14 radiates the signal subjected to FM modulation into the air via a not-shown antenna and transmits the signal to the receiving unit 20.

The receiving unit 20 includes an FM demodulator 21, a base band filter 22, a demapper 23, and a decoder 24.

The FM demodulator 21 demodulates a signal inputted and received via a not-shown antenna and supplies a four-level signal obtained by demodulating the signal to the base band filter 22.

The base band filter 22 includes a root raised cosine filter 131 and a 1/sinc filter 231 having a characteristic opposite to that of the sinc filter 132. The base band filter 22 blocks a predetermined frequency component of a four-level signal inputted from the FM demodulator 21 and outputs a four-level signal having an amplitude $\pi/2\sqrt{2}$ times as large as that of the input signal.

A Nyquist transmission path is formed in the ground mobile communication system 1 by the base band filter 22 and the base band filter 13 of the transmitting unit 10.

The demapper 23 sequentially converts a four-level signal inputted from the base band filter 22 into a binary signal of 2 bits and supplies the binary signal converted to the decoder 24.

The decoder 24 applies decoding processing, error correction processing, and the like to a binary signal supplied from the demapper 23 and outputs sound data, character data, and the like transmitted from the transmitting unit 10.

A communication operation of the ground mobile communication system 1 having the constitution described above will be explained with reference to a flowchart shown in FIG. 13.

Figure 13:
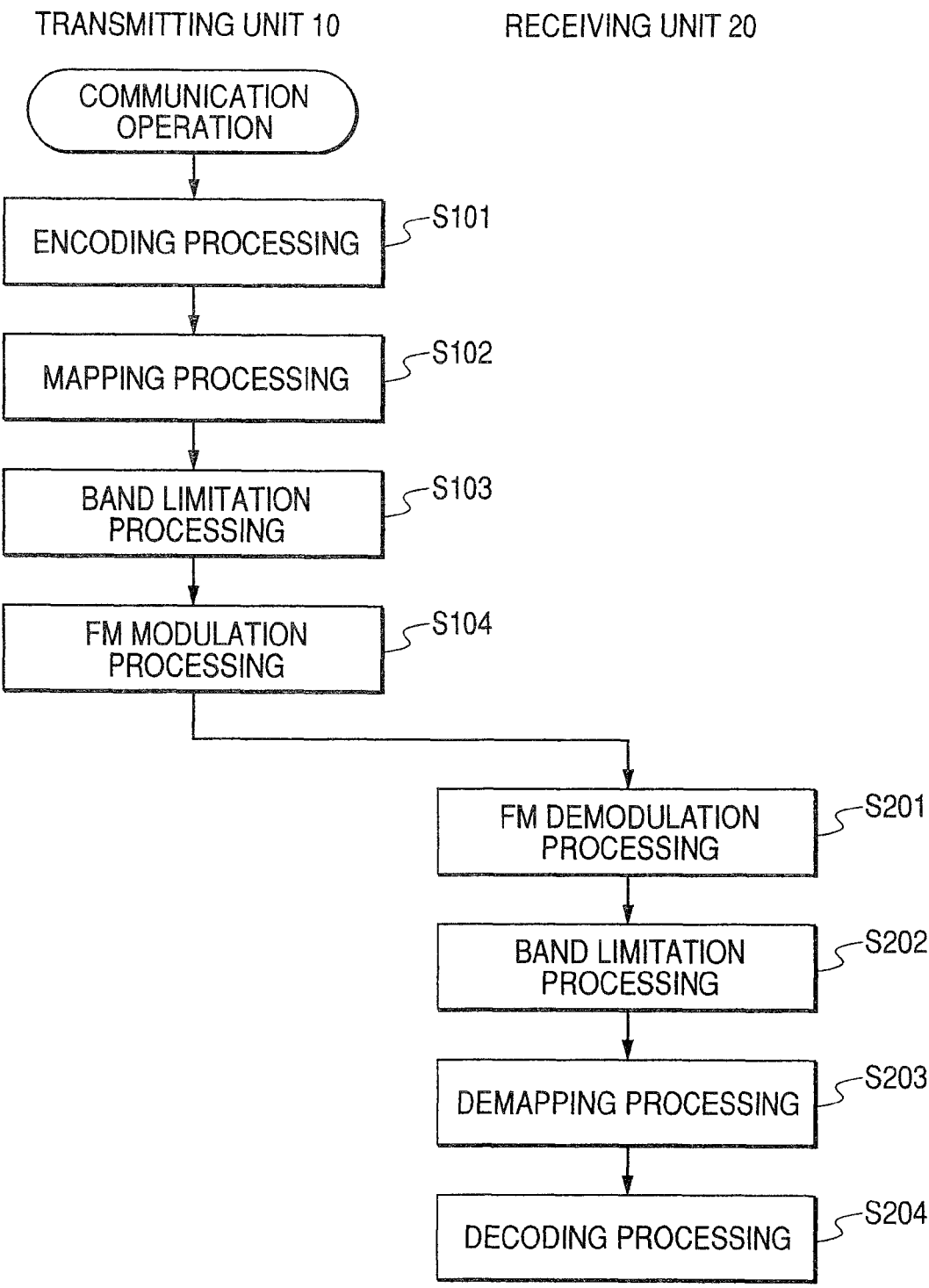
FIG. 13 is a flowchart for explaining operations of the ground mobile communication system according to the first embodiment.

When sound data, character data, and the like are inputted to the encoder 11 of the transmitting unit 10, the ground mobile communication system 1 starts the communication operation shown in the flowchart in FIG. 13.

The encoder 11 applies encoding processing to the sound data, the character data, and the like inputted to generate a binary signal and outputs the binary signal generated to the mapper 12 (step S101).

The mapper 12 applies mapping processing to the binary signal inputted from the encoder 11 to sequentially convert the binary signal into four-level symbols two bits at a time and outputs the symbols converted to the base band filter 13 (step S102).

The base band filter 13 shapes a waveform signal by applying band limitation processing to the symbols inputted from the mapper 12 to block a predetermined frequency component and outputs the waveform signal shaped to the FM modulator 14 (step S103).

The FM modulator 14 applies FM modulation signal to a transmission signal according to a magnitude of an amplitude of the waveform signal outputted from the base band filter 13 (step S104) and radiates the signal subjected to FM modulation to the air via the not-shown antenna to thereby transmit the sound data, the character data, and the like to the receiving unit 20.

The FM demodulator 21 of the receiving unit 20 applies FM demodulation processing to the signal inputted via the not-shown antenna and received and outputs a four-level signal obtained by demodulating the signal to the base band filter 22 (step S201).

The base band filter 22 applies band limitation processing to the four-level signal inputted from the FM demodulator 21 and outputs the four-level signal with a predetermined frequency component blocked to the demapper 23 (step S202).

The demapper 23 applies demapping processing to the four-level signal inputted from the base band filter 22, converts the four-level signal into a binary signal of 2 bits, and outputs the binary signal converted to the decoder 24 (step S203).

The decoder 24 applies decoding processing and the like to the binary signal supplied from the demapper 23 (step S204) to decode the sound data, the character data, and the like transmitted from the transmitting unit 10 and outputs the sound data, the character data, and the like.

Figure 14:
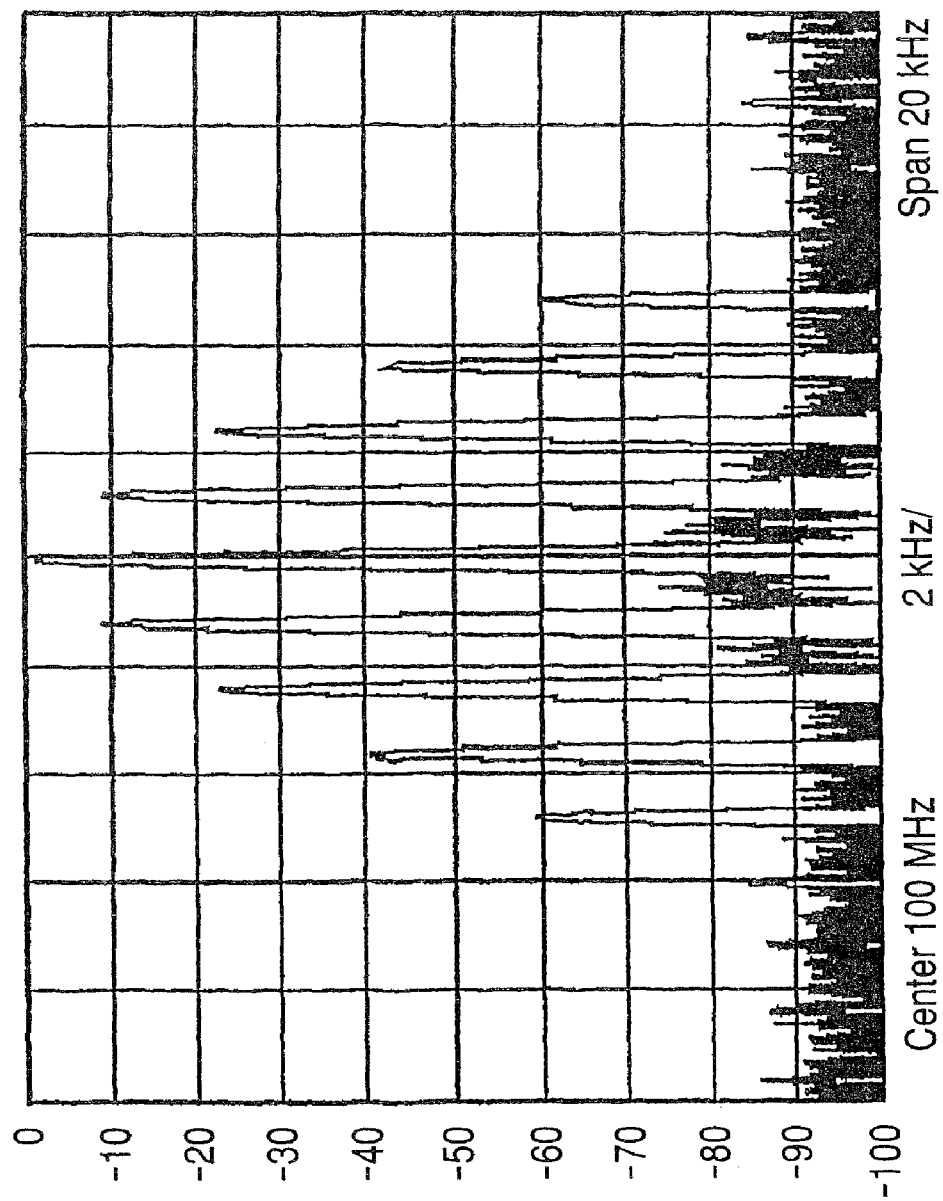
FIG. 14 is a graph showing a waveform of an emission spectrum in the case in which symbols of ±3 are alternately generated in the ground mobile communication system according to the first embodiment and the mask E.
Figure 15:
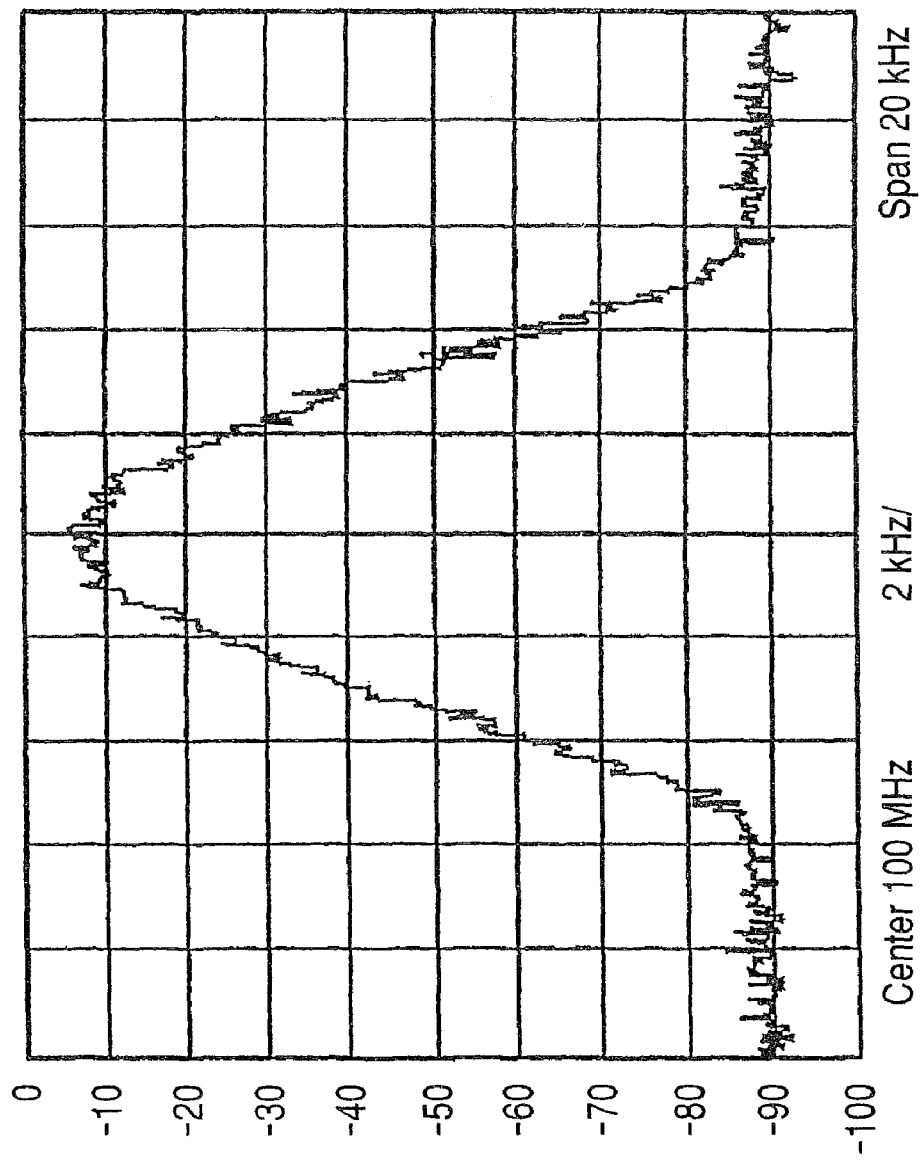
FIG. 15 is a graph showing a waveform of an emission spectrum in the case in which pseudo-random data is modulated in the ground mobile communication system according to the first embodiment and the mask E.

A waveform of an emission spectrum at the time when a nominal frequency shift is set to 1.057 kHz and at the time of the worst condition (when data corresponding to the symbol +3 and data corresponding to the symbol −3 are alternately inputted to the transmitting unit 10) is shown in FIG. 14. An emission spectrum at the time when pseudo-random data is inputted to the transmitting unit 10 is shown in FIG. 15.

[Second Embodiment]

A second embodiment will be explained. A transmission speed, a symbol rate, a base band filter, a modulation system, and a nominal frequency shift in the second embodiment are shown in Table 10 below.

TABLE 10

| | |
|---|---|
| Transmission Rate | 4800 bps |
| Symbol Rate | 2400 symbol/s |
| Base Band Filter | Transmission: A filter having a Root Raised Cosine characteristic with an arbitrary α<br>Reception: A filter having a Root Raised Cosine characteristic with an arbitrary α |
| Modulation System | Four-Level FSK Modulation System |
| Nominal Frequency Shift | Arbitrary in ranges +3 = +581 Hz to +673 Hz and −3 = −581 Hz to −673 Hz with respect to respective four symbol levels (±3, ±1) +1 and −1 are shifts 1/3 of +3 and −3, respectively |

Figure 16:
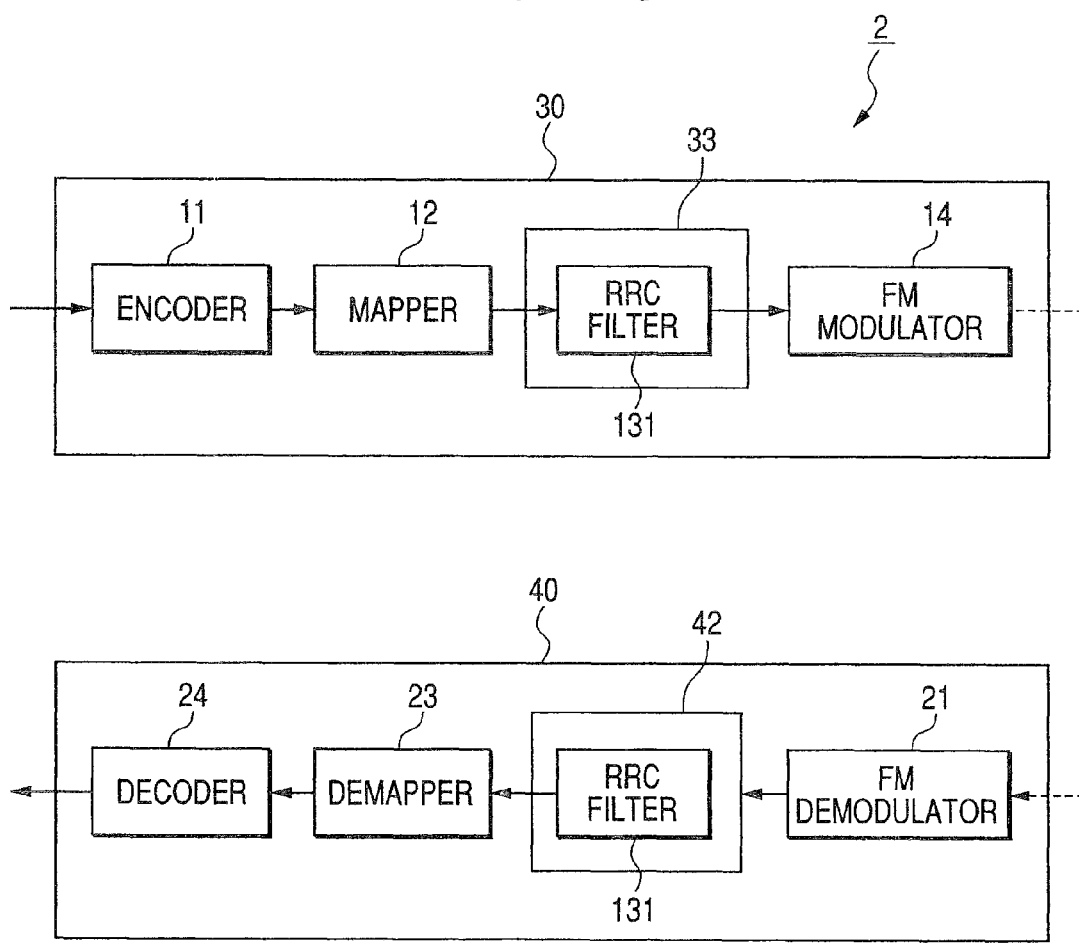
FIG. 16 is a block diagram showing a constitution of a ground mobile communication system according to a second embodiment of the invention.

FIG. 16 is a block diagram showing a constitution of a ground mobile communication system 2 according to the second embodiment of the invention. The ground mobile communication system 2 schematically includes a transmitting unit 30 and a receiving unit 40. Components identical with those in the first embodiment are denoted by the identical reference numerals. Explanations of the components are omitted.

In the ground mobile communication system 2, as a nominal frequency shift, a predetermined value of ±581 kHz to ±673 kHz are set with respect to a symbol level ±3 and a value 1/3 of the predetermined value is set with respect to a symbol level ±1.

The transmitting unit 30 includes the encoder 11, the mapper 12, a base band filter 33, and the FM modulator 14. The base band filter 33 includes a root raised cosine filter 131. The base band filter 33 shapes a rectangular symbol with a frequency of 1.2 kHz inputted from the mapper 12 into a waveform signal having an amplitude $\sqrt{2}$ times as large as that of the symbol and outputs the waveform signal.

The receiving unit 40 includes the FM demodulator 21, a base band filter 42, the demapper 23, and the decoder 24. The base band filter 42 includes a root raised cosine filter 131. The base band filter blocks a predetermined frequency component of a four-level signal inputted from the FM demodulator 21 and outputs a four-level signal having an amplitude $\sqrt{2}$ times as large as that of the input signal.

As in the ground mobile communication system 1, a Nyquist transmission path is formed in the ground mobile communication system 2 by the base band filter and the base band filter 33 of the transmitting unit 30.

Figure 17:
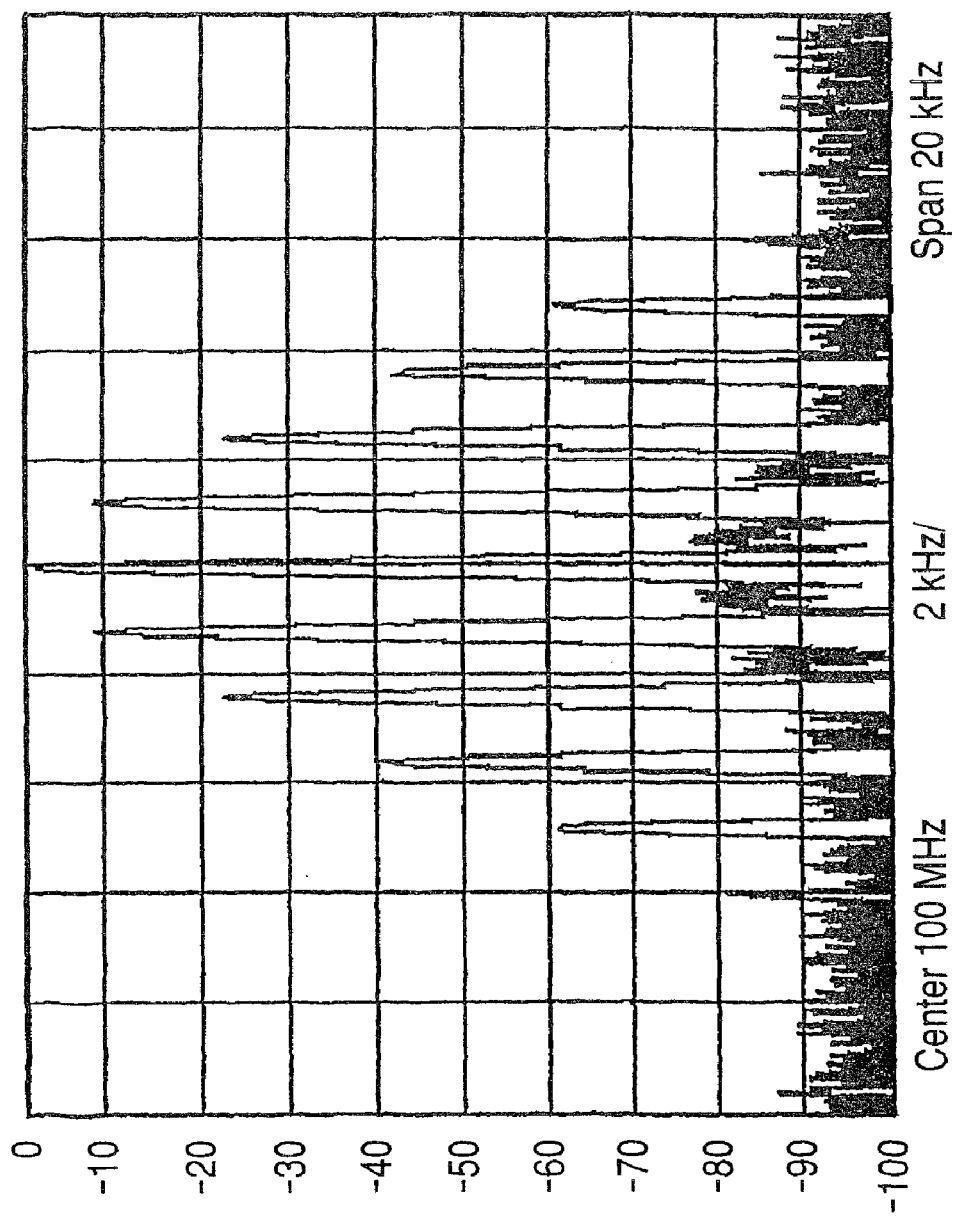
FIG. 17 is a graph showing a waveform of an emission spectrum in the case in which symbols of ±3 are alternately generated in the ground mobile communication system according to the second embodiment and the mask E.
Figure 18:
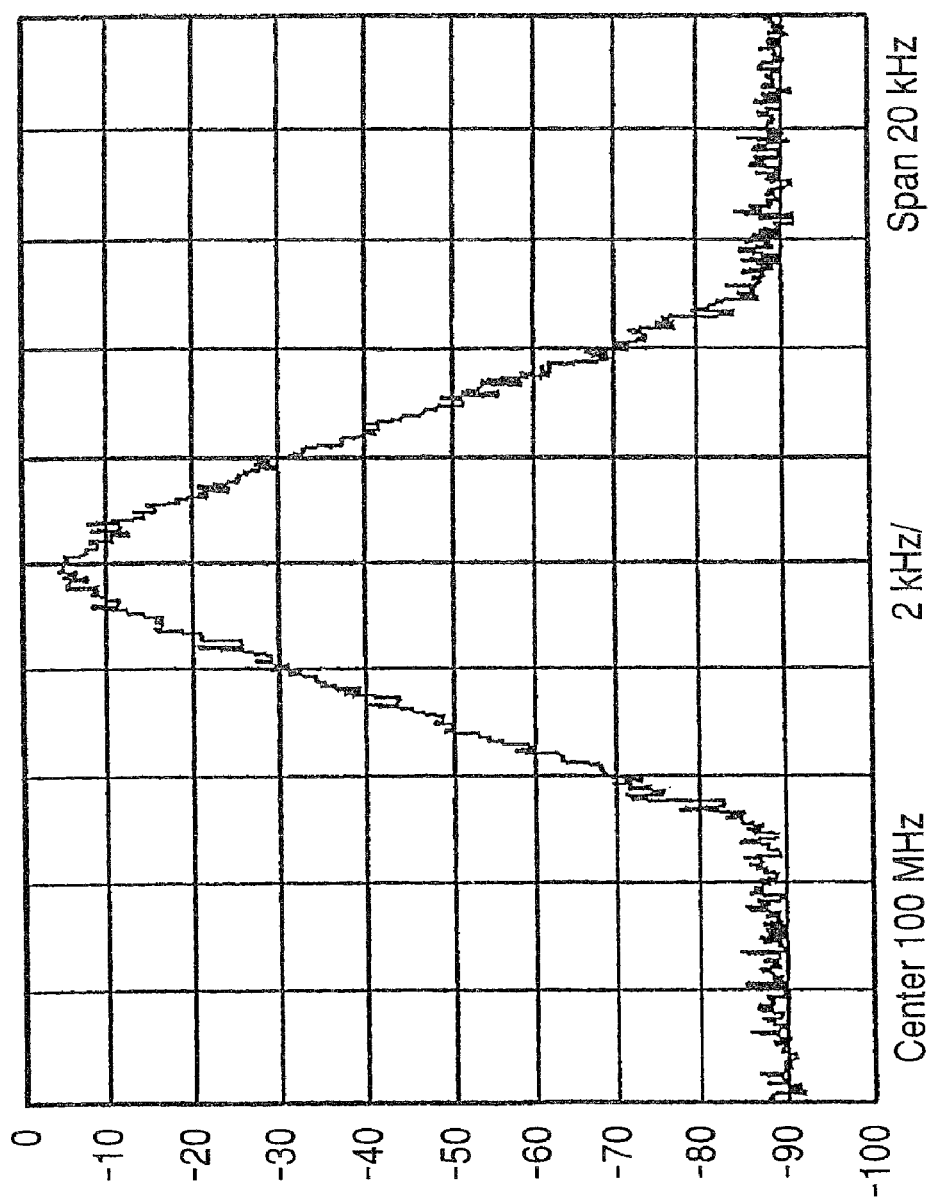
FIG. 18 is a graph showing a waveform of an emission spectrum in the case in which pseudo-random data is modulated in the ground mobile communication system according to the second embodiment and the mask E.

A waveform of an emission spectrum at the time when a nominal frequency shift is set to 0.673 kHz and at the time of the worst condition (when data corresponding to the symbol +3 and data corresponding to the symbol −3 are alternately inputted to the transmitting unit 30) is shown in FIG. 17. An emission spectrum at the time when pseudo-random data is inputted to the transmitting unit 30 is shown in FIG. 18.

From the first and second embodiments, in the ground mobile communication systems 1 and 2, even if nominal frequency shifts set are different, frequency shifts of signals actually outputted from the transmitting units 10 and 30 are the same. Thus, the emission spectra shown in FIGS. 14 and 17 indicate substantially the same characteristics. Since it is possible to confirm that a level of a spectrum is substantially equal to a level calculated from the Bessel function shown in Table 7, it is possible to prove correctness of installation of the ground mobile communication systems 1 and 2. Moreover, as shown in FIGS. 15 and 18, when pseudo-random data is used, since an emission spectrum has a sufficient room with respect to the standard of the mask E, the ground mobile communication systems 1 and 2 are capable of conforming to the FCC rule to be enforced in 2005.

According to the above description, the four-level FSK modulation system is applied to the LMR system in this embodiment. Thus, it is possible to directly apply a nonlinear power amplifier and an FM modulation and demodulation circuit of a radio apparatus of analog FM modulation presently operated in the LMR system applicable to the 12.5 kHz channel spacing to the LMR system in this embodiment. Therefore, the LMR system in this embodiment can conform to the FCC rule to be enforced in 2005 without using a linear power amplifier having a problem in terms of cost.

It is possible to handle sound data, character data, and the like all together by applying a modulation system that uses digital data. Thus, the LMR system is suitable for demand for data communication in these days.

Since it is possible to reduce an error rate while adapting the LMR system to the FCC rule to be enforced in 2005, it is possible to attain a sensitivity equal to or higher than a reference sensitivity of the conventional analog FM modulation. A call distance is longer compared with the conventional call distance. Moreover, since a transmission power falls when the call distance is the same, it is possible to reduce a consumed current in the LMR system.

In order to keep downward compatibility, a radio apparatus actually used is required to also implement an operation mode of analog FM modulation used in the LMR system applicable to the 12.5 kHz channel spacing. However, in the LMR system in this embodiment, since the four-level FSK modulation system having compatibility with a large number of circuits is adopted, dual mode design is possible. Moreover, the P25-P1 modulation system is based on the four-level FSK modulation system, although there is a difference in parameters. Thus, dual mode design in combination with the P25-P1 modulation system is also possible.

The invention is not limited to the embodiments and various modifications and applications of the embodiments are possible. Modifications of the embodiments applicable to the invention will be explained.

In the embodiments, the base band filter of the candidate VII is used in the first embodiment and the base band filter of the candidate V is used in the second embodiment. However, the invention is not limited to these base band filters. The base band filter of the candidate II may be used.

A transmission rate, a symbol rate, a base band filter, a modulation system, and a nominal frequency shift in the case in which the base band filter of the candidate II is used are shown in Table 11 below.

TABLE 11

| | |
|---|---|
| Transmission Rate | 4800 bps |
| Symbol Rate | 2400 symbol/s |
| Base Band Filter | Transmission: A filter obtained by combining a filter having a Raised Cosine characteristic with an arbitrary α and a filer having a 1/sinc function characteristic |
| | Reception: A filter having a sinc function characteristic |

TABLE 11-continued

| | |
|---|---|
| Modulation System | Four-Level FSK Modulation System |
| Nominal Frequency Shift | Arbitrary in ranges of +3 = +523 Hz to +606 Hz and −3 = −523 Hz to −606 Hz with respect to respective four symbol levels (±3, ±1) +1 and −1 are shifts 1/3 of +3 and −3, respectively |

FIG. 19 is a block diagram showing a constitution of a ground mobile communication system 3 according to a modification of the invention. The ground mobile communication system 3 schematically includes a transmitting unit 50 and a receiving unit 60. Components identical with those in the first and second embodiments are denoted by the identical reference numerals and explanations of the components are omitted.

In the ground mobile communication system 3, as a nominal frequency shift, a predetermined value of ±0.523 kHz to ±0.606 kHz are set with respect to a symbol level ±3 and a value ⅓ of the predetermined value is set with respect to a symbol level ±1.

The transmitting unit 50 includes the encoder 11, the mapper 12, a base band filter 53, and the FM modulator 14. The base band filter 53 includes a root raised cosine filter 531 and a 1/sinc filter 231. The base band filter 53 shapes a rectangular symbol with a frequency of 1.2 kHz inputted from the mapper 12 into a waveform signal having an amplitude $\pi/2$ times as large as that of the symbol and outputs the waveform signal.

The receiving unit 60 includes the FM demodulator 21, a base band filter 62, the demapper 23, and the decoder 24. The base band filter 62 includes a sinc filter 132 having a characteristic opposite to that of the 1/sinc filter 231. The base band filter 62 blocks a predetermined frequency component of a four-level signal inputted from the FM demodulator 21 and outputs a four-level signal having an amplitude $2/\pi$ times as large as that of the input signal.

As in the ground mobile communication systems 1 and 2, a Nyquist transmission path is formed in the ground mobile communication system 3 by the base band filter 62 and the base band filter 53 of the transmitting unit 50 described above.

As described above, the base band filter of the candidate II is inferior to the base band filters of the candidates VII and V in terms of a sensitivity but includes the same filter constitution as the base band filter used in the P25-P1 modulation system. Therefore, it is possible to use a coefficient of a filter that is the same as the base band filter used in the P25-P1 modulation system as long as a roll-off factor α has the same value as that of the base band filter used in the P25-P1 modulation system. Thus, it is possible to reduce a circuit size or a memory size.

In the embodiments, the four-level FSK modulation system is adopted as a multi-value FSK modulation system. However, the invention is not limited to this. An octonary FSK modulation system, a hexadecimal FSK modulation system, and the like may be adopted. For example, when the octonary FSK modulation system is used, since a symbol rate is fixed at 2400 symbol/s, a transmission rate is 7200 bps. A symbol level takes eight values of ±7, ±5, ±3, and ±1. When symbols of +7 and −7 are alternately sent, a sine wave of 1.2 kHz is formed. Therefore, if actual frequency shifts in the symbols of +7 and −7 are set to, for example, the values defined in the first and second embodiments, the modification and the like, it is possible to adapt an emission spectrum to the mask E as in the case in which a symbol level takes four values. By adopting such a condition, it is possible to obtain a higher transmission rate by using, other than the octonary FSK modulation system, the hexadecimal FSK modulation system or an FSK modulation system of a larger value while adapting an emission spectrum to the mask E.

In the embodiments, the mobile communication system is the ground mobile communication system. However, the invention is not limited to this. The mobile communication system may be a mobile communication system used on the sea.

INDUSTRIAL APPLICABILITY

According to the invention, it is possible to provide a modulating apparatus, a ground mobile communication system, a modulating method, and a communication method that can conform to the FCC rule to be enforced in 2005 without using a linear power amplifier.

What is claimed is:

1. A modulating apparatus in a mobile communication system that performs data communication at a rate for transmitting 2400 symbols per second, each of the symbols having multi-level, characterized by comprising:
   a base band filter that blocks an unnecessary frequency component of a multi-level symbol inputted and outputs a waveform signal; and
   frequency shifting and modulating means for shifting to modulate a frequency of an output signal according to a magnitude of an amplitude of the waveform signal inputted from the base band filter, and in that
   when a positive symbol and a negative symbol each of which has a maximum absolute value are alternately and repeatedly inputted, the frequency shifting and modulating means is adjusted so as to have a frequency shift within a range between a frequency shift which is decided by a modulation index adapted to an emission mask determined based on a condition that the positive symbol and the negative symbol each of which has the maximum absolute value are alternately and repeatedly inputted and a frequency shift which is decided by a modulation index adapted to the emission mask determined based on a condition that pseudo-random data is inputted.

2. The modulating apparatus according to claim 1, characterized in that the base band filter is a Nyquist filter.

3. A modulating apparatus in a mobile communication system that performs data communication at a transmission rate of 2400×(n+1) (n: natural number) [bps], characterized by comprising:
   symbol converting means for sequentially converting a binary signal generated by encoding predetermined data into a $2^{(n+1)}$-ary symbol, which includes ($2^{(n+1)}+1-2k$) ($1 \leq k \leq 2^{(n+1)}$) values, (n+1) bits at a time and outputting the symbol;
   a base band filter that blocks an unnecessary frequency component of a symbol inputted from the symbol converting means and outputs a waveform signal; and
   frequency shifting and modulating means for shifting to modulate a frequency of an output signal according to a magnitude of an amplitude of the waveform signal inputted from the base band filter, and in that
   when a symbol of $+(2^{(n+1)}-1)$ and a symbol of $-(2^{(n+1)}-1)$ are alternately and repeatedly outputted from the symbol converting means, the frequency shifting and modulating means has a value within a range between a frequency shift which is decided by a modulation index adapted to an emission mask determined based on a condition that a positive symbol and a negative symbol each of which has a maximum absolute value are alternately and repeatedly inputted and a frequency shift which is decided by a modulation index adapted to the emission mask determined based on a condition that pseudo-random data is inputted.

4. The modulating apparatus according to claim 2, characterized in that the base band filter is a Nyquist filter.

5. A modulating method in a mobile communication system that performs data communication at a rate for transmitting 2400 symbols per second, each of the symbols having multi-level, characterized by comprising:
   a step of blocking an unnecessary frequency component of a multi-level symbol inputted and outputting a waveform signal; and
   a frequency shifting and modulating step of shifting to modulate a frequency of an output signal according to a magnitude of an amplitude of the waveform signal inputted, and in that
   in the frequency shifting and modulating step, when a positive symbol and a negative symbol each of which has a maximum absolute value are alternately and repeatedly inputted, a signal processing is performed so as to have a frequency shift within a range between a frequency shift which is decided by a modulation index adapted to an emission mask determined based on a condition that the positive symbol and the negative symbol each of which has the maximum absolute value are alternately and repeatedly inputted and a frequency shift which is decided by a modulation index adapted to the emission mask determined based on a condition that pseudo-random data is inputted.

6. A modulating method in a mobile communication system that performs data communication at a transmission rate of 2400×(n+1) (n: natural number) [bps], characterized by comprising:
   a symbol converting step of sequentially converting a binary signal generated by encoding predetermined data into a $2^{(n+1)}$-ary symbol, which includes ($2^{(n+1)}+1-2k$) ($1 \leq k \leq 2^{(n+1)}$) values, (n+1) bits at a time and outputting the symbol;
   a step of blocking an unnecessary frequency component of a symbol inputted from the symbol converting means and outputting a waveform signal; and
   a frequency shifting and modulating step of shifting to modulate a frequency of an output signal according to a magnitude of an amplitude of the waveform signal inputted, and in that
   when a symbol of $+(2^{(n+1)}-1)$ and a symbol of $-(2^{(n+1)}-1)$ are alternately and repeatedly outputted from the symbol converting step, the frequency shifting and modulating step has a processed value within a range between a frequency shift which is decided by a modulation index adapted to an emission mask determined based on a condition that a positive symbol and a negative symbol each of which has a maximum absolute value are alternately and repeatedly inputted and a frequency shift which is decided by a modulation index adapted to the emission mask determined based on a condition that pseudo-random data is inputted.

* * * * *